(12) United States Patent
Bertels

(10) Patent No.: US 10,479,489 B2
(45) Date of Patent: Nov. 19, 2019

(54) ROTARY DEVICE, FOR INSTANCE AN AIR MOVER SUCH AS A FAN, A PROPELLER OR A LIFTING ROTOR, A WATER TURBINE OR A WIND TURBINE

(71) Applicant: Eco-Logical Enterprises B.V., Amersfoort (NL)

(72) Inventor: Augustinus Wilhelmus Maria Bertels, Doorwerth (NL)

(73) Assignee: ECO-LOGICAL ENTERPRISES B.V., Amersfoort (NL)

( * ) Notice: Subject to any disclaimer, the term of this patent is extended or adjusted under 35 U.S.C. 154(b) by 564 days.

(21) Appl. No.: 14/904,009

(22) PCT Filed: Jul. 8, 2014

(86) PCT No.: PCT/NL2014/050458
§ 371 (c)(1),
(2) Date: Jan. 8, 2016

(87) PCT Pub. No.: WO2015/005776
PCT Pub. Date: Jan. 15, 2015

(65) Prior Publication Data
US 2016/0152327 A1 Jun. 2, 2016

(30) Foreign Application Priority Data

Jul. 9, 2013 (NL) ...................................... 2011128

(51) Int. Cl.
*F04D 25/06* (2006.01)
*B64C 27/20* (2006.01)
(Continued)

(52) U.S. Cl.
CPC .............. *B64C 27/20* (2013.01); *B60K 16/00* (2013.01); *B64C 11/001* (2013.01); *F03B 11/02* (2013.01);
(Continued)

(58) Field of Classification Search
CPC .............. F05B 2240/33; F05B 2240/52; F04D 25/0653; F04D 25/082; F04D 25/0606;
(Continued)

(56) References Cited

U.S. PATENT DOCUMENTS

| 728,038 A | 5/1903 | Stowe | |
|---|---|---|---|
| 3,708,251 A * | 1/1973 | Pierro | B63H 5/125 310/263 |

(Continued)

FOREIGN PATENT DOCUMENTS

| AT | 390 600 | 5/1990 |
|---|---|---|
| DE | 2305776 | 8/1974 |

(Continued)

OTHER PUBLICATIONS

International Search Report from PCT/NL2014/050459 dated Jul. 8, 2014.
(Continued)

*Primary Examiner* — Charles G Freay
*Assistant Examiner* — Thomas Fink
(74) *Attorney, Agent, or Firm* — Adsero IP

(57) ABSTRACT

A rotary device comprises a frame with a guide for flowing medium, a rotor with a number of blades, whereby a relation is obtained between the flowing medium and the rotation of the rotor, and energy converting means, the one part of which is connected to the frame and the other part to the rotor. The device has the feature that the end zones of the blades are connected to a ring, the ring has a radial section with the shape of an isosceles triangle or trapezium, the medium guide has an encircling recess, the form of which corresponds to the form of the ring and the ring fits with clearance into the recess, permanent magnets are added to the truncated conical surfaces, electromagnets debouch on both the corresponding surfaces of the recess, this such that (Continued)

the ring and the frame together form an annular induction motor or an electric generator.

20 Claims, 25 Drawing Sheets

(51) Int. Cl.
| | |
|---|---|
| *F03D 9/25* | (2016.01) |
| *B60K 16/00* | (2006.01) |
| *B64C 11/00* | (2006.01) |
| *F03B 11/02* | (2006.01) |
| *F03B 13/00* | (2006.01) |
| *F03D 1/06* | (2006.01) |
| *F04D 29/32* | (2006.01) |
| *F04D 29/52* | (2006.01) |
| *F03D 1/04* | (2006.01) |
| *F03D 13/20* | (2016.01) |
| *F03D 1/02* | (2006.01) |

(52) U.S. Cl.
CPC ............... *F03B 13/00* (2013.01); *F03D 1/04* (2013.01); *F03D 1/065* (2013.01); *F03D 9/25* (2016.05); *F03D 9/255* (2017.02); *F03D 13/20* (2016.05); *F04D 25/06* (2013.01); *F04D 25/066* (2013.01); *F04D 29/325* (2013.01); *F04D 29/522* (2013.01); *F03D 1/02* (2013.01); *F05B 2240/33* (2013.01); *Y02E 10/721* (2013.01)

(58) Field of Classification Search
CPC . F03D 1/04; F03D 1/065; F03B 11/02; B64C 11/001; H02K 1/2786; H02K 7/18; H02K 5/20; H02K 9/00–9/28
USPC ........................................................ 290/55
See application file for complete search history.

(56) References Cited

U.S. PATENT DOCUMENTS

| | | | | |
|---|---|---|---|---|
| 4,064,403 | A * | 12/1977 | Miller .................... | F01D 15/10 290/52 |
| 4,132,414 | A | 1/1979 | Dinsdale | |
| 4,459,087 | A * | 7/1984 | Barge ..................... | F01P 5/04 123/41.12 |
| 4,517,540 | A * | 5/1985 | McDougal ............. | F16L 37/084 336/107 |
| 4,720,640 | A * | 1/1988 | Anderson .............. | F03B 13/083 290/43 |
| 4,807,830 | A * | 2/1989 | Horton .................. | B64C 39/001 244/12.2 |
| 5,289,088 | A | 2/1994 | Andoh | |
| 5,432,658 | A | 7/1995 | Kajita | |
| 5,474,429 | A * | 12/1995 | Heidelberg ........... | F04D 25/066 310/63 |
| 5,535,582 | A | 7/1996 | Paweletz | |
| 5,886,610 | A | 5/1999 | Canova | |
| 8,446,243 | B2 | 5/2013 | Strzalkowski | |
| 8,752,787 | B2 * | 6/2014 | Ruan ..................... | B64C 27/20 244/12.2 |
| 8,933,598 | B2 * | 1/2015 | Dunne .................. | H02K 1/20 310/52 |
| 9,583,132 | B2 * | 2/2017 | Bertels ................. | G11B 5/5578 |
| 10,293,926 | B2 * | 5/2019 | Perlo .................... | B63H 25/42 |
| 2003/0193198 | A1 * | 10/2003 | Wobben .............. | F03B 13/264 290/54 |
| 2004/0069901 | A1 * | 4/2004 | Nunnally ............... | B64C 27/20 244/34 R |
| 2006/0278963 | A1 | 12/2006 | Harada | |
| 2008/0042504 | A1 * | 2/2008 | Thibodeau .......... | F16C 32/0436 310/90.5 |
| 2008/0193305 | A1 * | 8/2008 | Tateishi .................. | A47L 5/12 417/423.14 |
| 2008/0292467 | A1 * | 11/2008 | Borgen .................. | B63H 13/00 416/244 R |
| 2010/0201129 | A1 * | 8/2010 | Holstein ............... | F03B 13/264 290/53 |
| 2010/0290890 | A1 * | 11/2010 | Bertels .................. | F04D 29/325 415/77 |
| 2011/0031760 | A1 * | 2/2011 | Lugg ....................... | F03D 1/025 290/55 |
| 2011/0074397 | A1 | 3/2011 | Bulumulla | |
| 2012/0068693 | A1 | 3/2012 | Ocket | |
| 2012/0094555 | A1 | 4/2012 | Calverley | |
| 2012/0201703 | A1 * | 8/2012 | Tanaka ..................... | B63H 1/16 417/423.7 |
| 2012/0211990 | A1 * | 8/2012 | Davey ................... | F03B 13/264 290/54 |
| 2012/0299685 | A1 | 11/2012 | Yokota | |
| 2013/0323096 | A1 * | 12/2013 | Mueller ................ | F04D 25/082 417/368 |
| 2014/0255207 | A1 * | 9/2014 | Boyer ....................... | F01D 5/18 416/97 R |
| 2016/0163445 | A1 | 6/2016 | Bertels | |

FOREIGN PATENT DOCUMENTS

| | | |
|---|---|---|
| DE | 2744125 | 4/1979 |
| DE | 3203958 | 8/1982 |
| DE | 10 2004 063205 | 5/2006 |
| EP | 0 035 964 | 9/1981 |
| EP | 1 260 998 | 11/2002 |
| EP | 1 353 436 | 10/2003 |
| EP | 1878911 | 1/2008 |
| EP | 2 551 190 | 1/2013 |
| GB | 2 370 922 | 7/2002 |
| JP | S56140562 | 11/1981 |
| JP | S59 101068 | 6/1984 |
| JP | H06 325948 | 11/1994 |
| WO | WO 96/19670 | 6/1996 |

OTHER PUBLICATIONS

International Search Report from PCT/NL2014/050458 dated Oct. 15, 2014.
Norris (2005) Flight International "Levitating Fan Rotor Paves Way to Electric Flight" 168 (4994): 22.
International Search Report from PCT/NL2014/050497 dated Apr. 2, 2015.
Notice of Allowance for U.S. Appl. No. 14/907,057 dated Jul. 14, 2016.
Office Action for U.S. Appl. No. 14/903,990 dated Jun. 14, 2018.
Notice of Allowance for U.S. Appl. No. 14/903,990 dated Dec. 28, 2018.

* cited by examiner

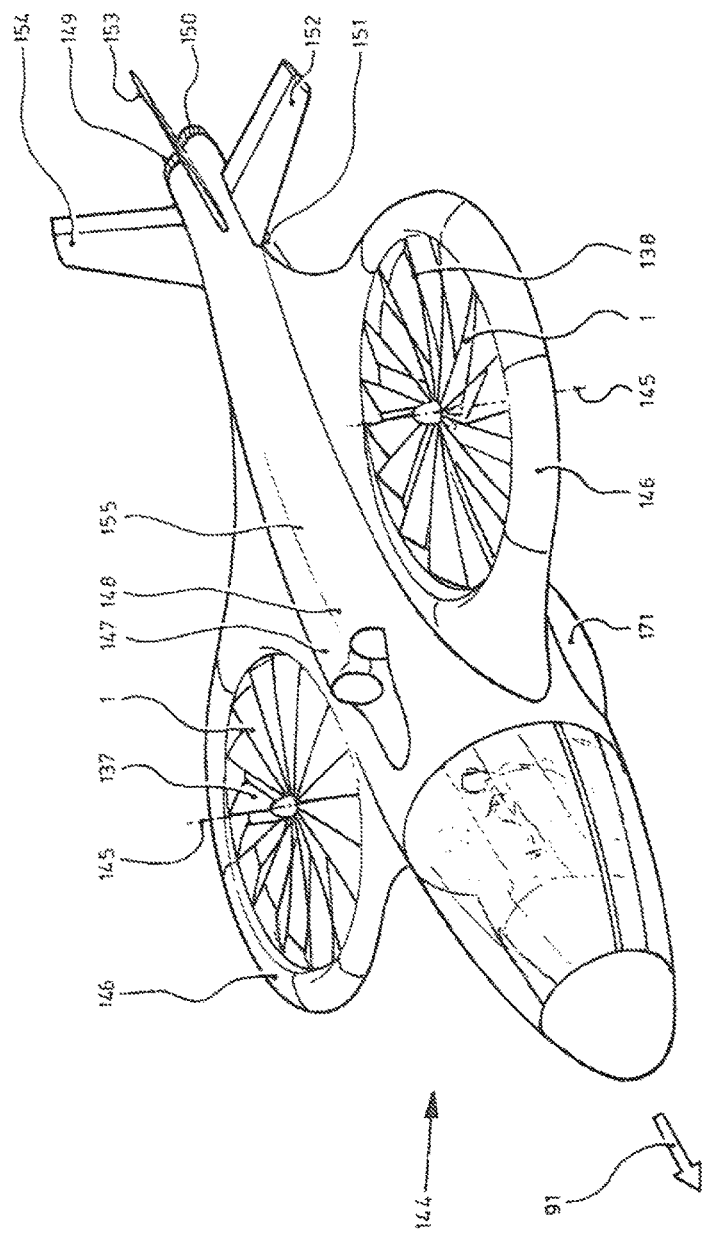

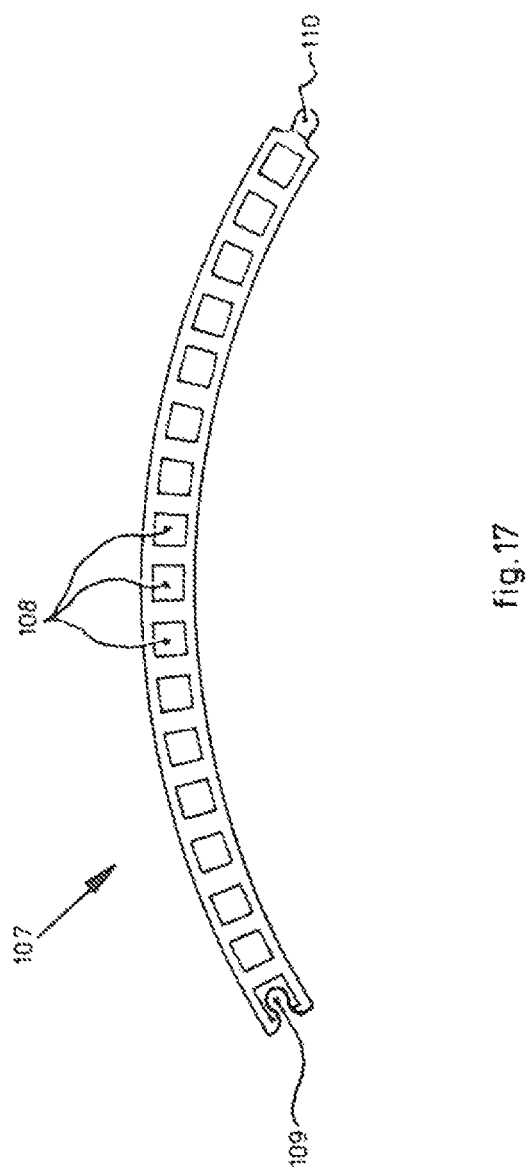

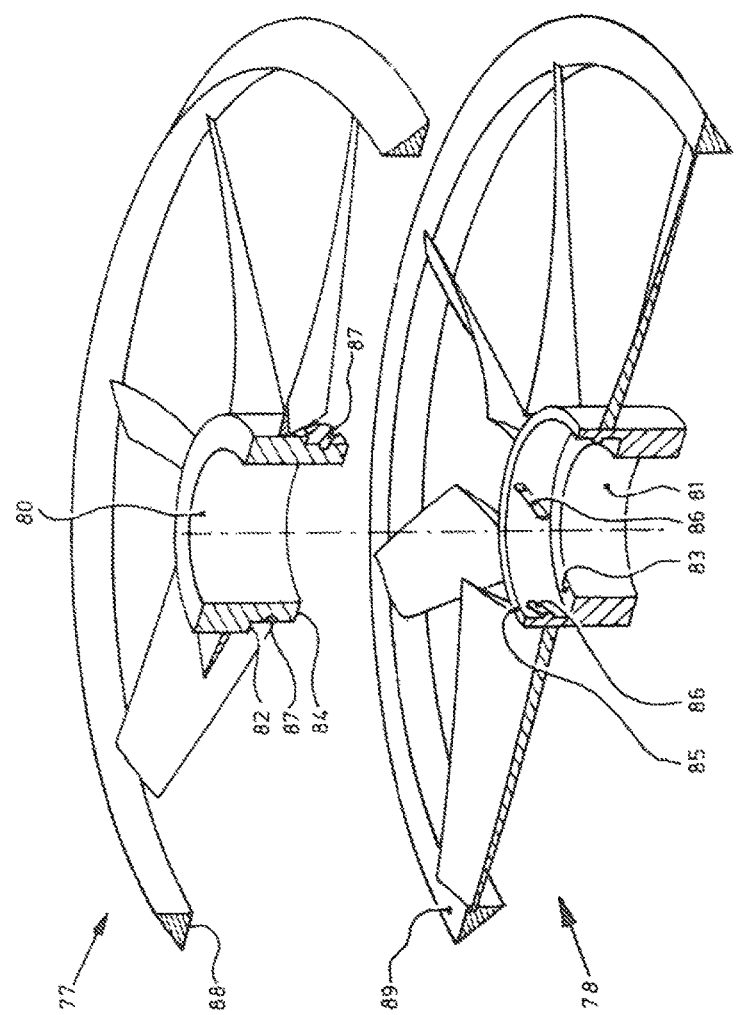

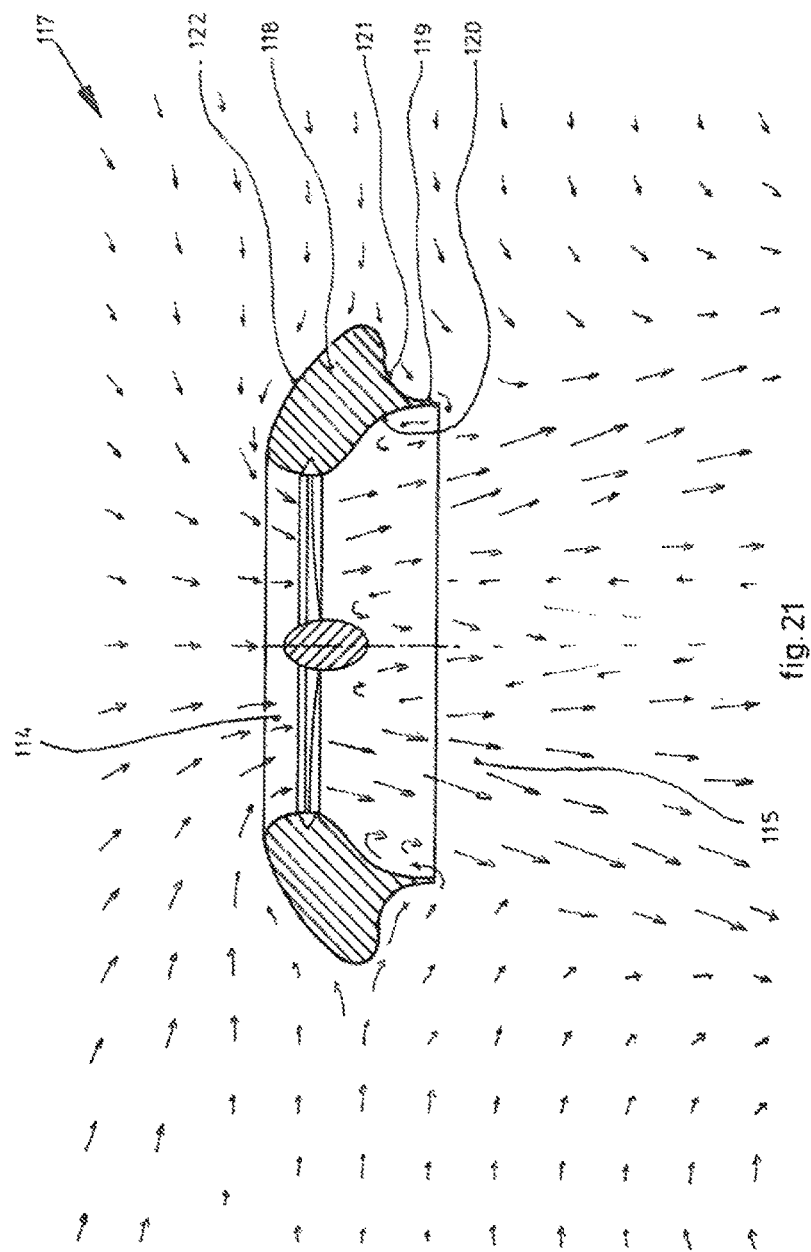

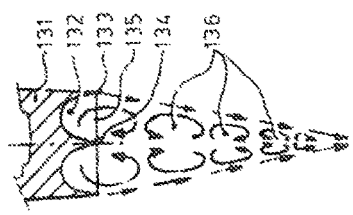
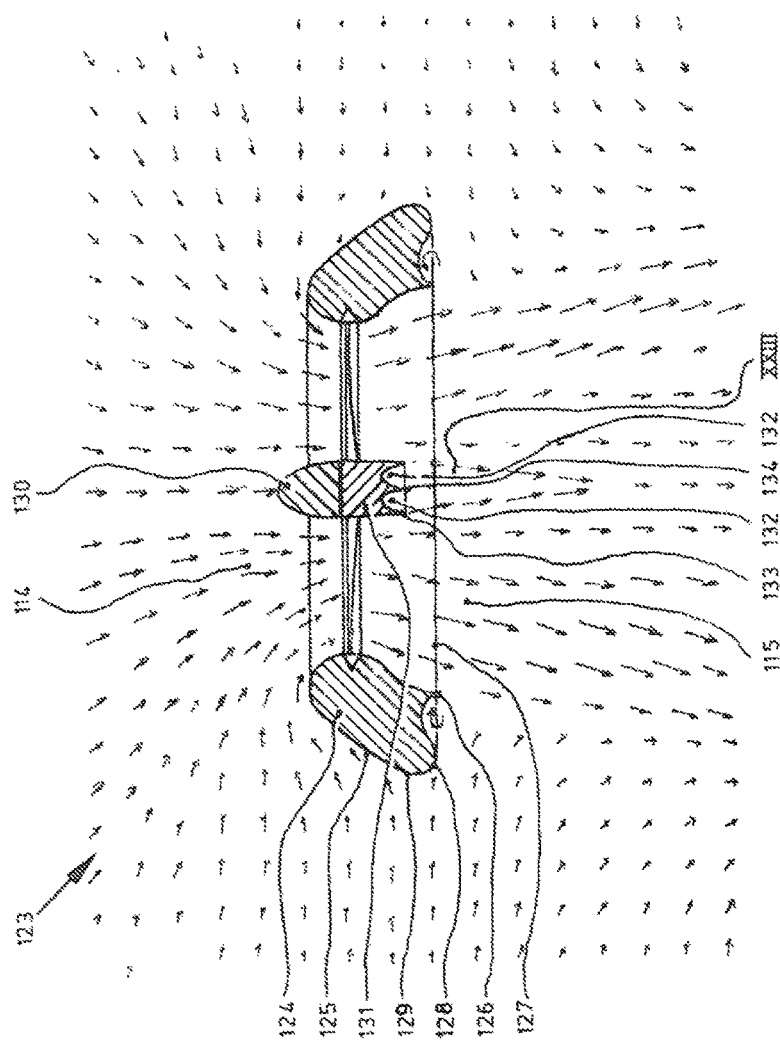

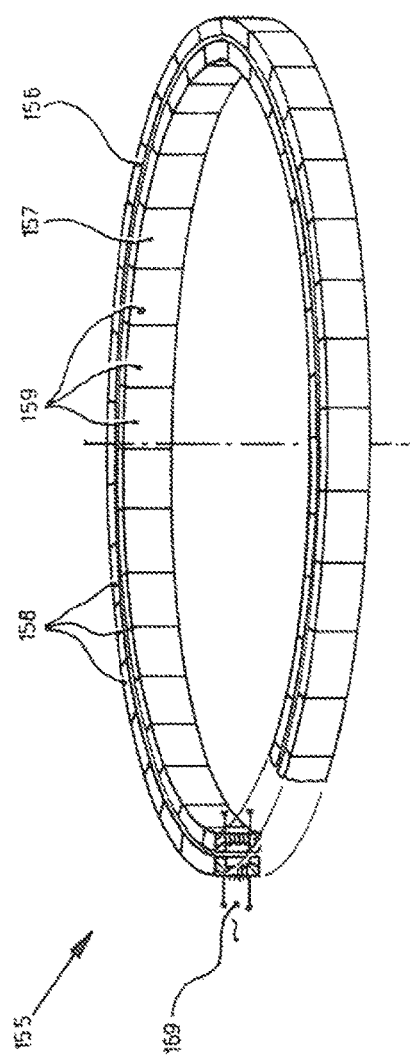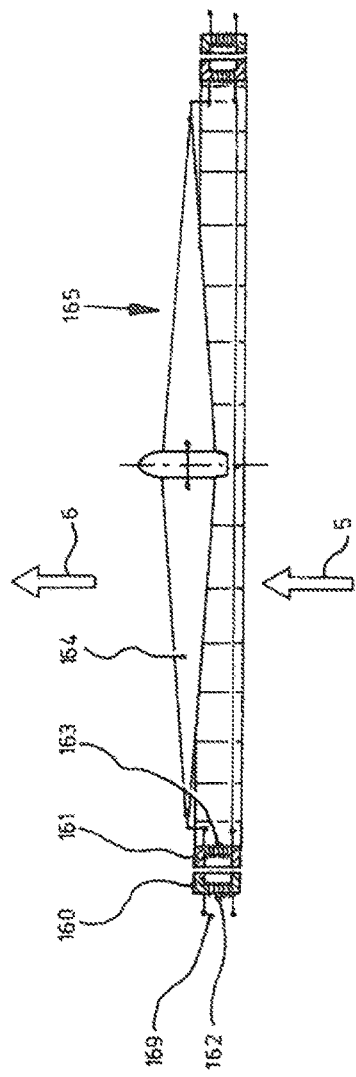

ROTARY DEVICE, FOR INSTANCE AN AIR MOVER SUCH AS A FAN, A PROPELLER OR A LIFTING ROTOR, A WATER TURBINE OR A WIND TURBINE

RELATED APPLICATIONS

This application is a 35 U.S.C. § 371 national phase application of PCT/NL2014/050458 (WO 2015/005776), filed on Jul. 8, 2014, entitled "Rotary Device, for Instance an Air Mover Such as a Fan, a Propeller or a Lifting Rotor, a Water Turbine or a Wind Turbine", which application claims priority to Netherlands Application No. 2011128, filed Jul 9, 2013, which is incorporated herein by reference in its entirety.

The invention relates to a rotary device for converting one form of energy to another form of energy, which forms of energy are electrical energy and the energy of a flowing medium, the device comprising:

a frame with an inlet and an outlet and a rotation-symmetrical guide for the flowing medium extending between the inlet and the outlet;

a rotor supported rotatably at least during operation by said frame and having a central hub and a number of blades which are connected to said hub in angularly equidistant arrangement and which extend at least more or less in radial direction, which blades all have a form such that a relation between the flowing medium and the rotation of the rotor is obtained; and energy converting means, the one part of which is connected fixedly to the frame and the other part is connected fixedly to the rotor.

Such a device is known in many embodiments, for instance as fan, as propeller or lifting rotor, a water turbine or a wind turbine, wherein available energy is used to set a medium, for instance air or a liquid medium such as water, into motion by means of the rotor. Also known is a device which converts the energy present in a flowing medium into electrical energy by interaction with the rotor. This is for instance a wind turbine, a water turbine or the like.

For the purpose of cooling rooms with servers such as in data centres use is made of relatively heavy axial fans having for instance a diameter of 0.06-0.15 m. The fans are relatively inefficient and have a small lift height. Use is therefore also made of centrifugal fans. These have a greater lift height and are thereby better capable of overcoming the flow resistance of the heat exchangers for discharging the server heat.

The German manufacturer Pabst is, among others, traditionally an engine maker. Pabst therefore focuses primarily on increasing the engine power on the basis of a small hub. It is also noted here that with the traditional construction of fans, i.e. a centrally placed motor driving the rotor, the central bearings are heavily loaded axially. With the mindset of such companies and within their technical tradition they are able to design and produce motors with which a fan can be driven at substantially increased rotation speed. The airflow is substantially accelerated as a result. The power increases by a power of three of the flow rate, and as a result the bearing forces increase, as does the heat to be dissipated due to the power. This does not alter the fact that such known fans are subject to the drawbacks inherent to a coaxial arrangement of the motor relative to the fan blades. Central motor does after all block a substantial part of the throughflow surface area. A high rotation speed must therefore be realized of necessity. Use is made of rotors with for instance eleven blades, the aerodynamic form of which usually leaves much to be desired. The fans hereby produce a relatively great deal of noise, first and foremost due to the occurrence of so-called tip vortices, i.e. the vortices around the blade end, and also in the zone of the hub. These vortices occur because the tips, or outer ends of the blade around which there is free flow, move at high speed inside a more or less annular housing at a distance from the inner surface thereof. It will be apparent from the above that such a structure results in energy loss and noise and that the efficiency of such fans leaves something to be desired. The limitations in respect of the motor design lie mainly in the limited possibilities of accumulating heat, whereby specific cooling provisions are necessary, the fundamentally limited power density and the lifespan of the bearings which are after all heavily loaded due to the nature of this structure.

Any usual server module produces a heat capacity of 2-3 kW. This is comparable to a sizeable fan heater for household use. The fan must be capable of discharging this heat from the large printed circuit boards with LSI chips and other components at a speed such that the temperature of the server cabinet remains limited to the maximum allowable value, for instance 40° C.

In order to realize a more intensive cooling a large quantity of throughflow air is necessary per unit time. This mainly realizes a substantially increased lift height. Such cascaded fan units have the drawback of being relatively costly and taking up a great deal of space, particularly in the flow direction. They have the advantage that, in an ideal case of opposite rotation directions of the two fans, the airflow leaving the fan unit is largely free of a rotation component. The tip vortices reduce this advantage substantially. In usual fans rotation components remain so strong, even at a great distance from the fan, that the co-action with a heat exchanger or the structure of a heat-producing printed circuit board often leaves something to be desired in terms of efficient heat removal.

In the light of the above considerations relating to the prior art rotary devices the invention provides a device of an above specified type which has the feature that the rotor comprises a concentric ring to which the end zones of the blades are connected;

the ring has two equal truncated conical surfaces with mutually opposite orientations, has for instance a radial section with at least partially the general shape of an isosceles triangle or trapezium, the base of which extends parallel to the central axis, also the rotation axis, of the rotor and the sides of which converge outward;

the medium guide has an encircling recess, the form of which corresponds to that of the ring such that the ring fits with clearance into the recess;

permanent magnets are added to each of the truncated conical surfaces corresponding to said sides, which magnets are placed angularly equidistant and the poles of which debouch on said surfaces;

the poles of the electromagnets, each with a core and a coil, equally placed equidistantly on the permanent magnets debouch on both the corresponding surfaces of the recess;

this such that the ring with the permanent magnets and the frame with the electromagnets together form an annular induction motor or an electric generator;

an electronic unit is added to the electromagnets which is configured to supply the electromagnets with alternating currents such that through the electromagnetic interaction between the electromagnets and the permanent magnets the rotor is driven rotatingly, or which is configured to convert the currents induced in the electromagnets by throughflowing medium during rotating drive of the rotor to a form of electric current suitable for a user, for instance for exporting back to the electricity grid; and the electronic unit is also configured to supply the electromagnets with alternating currents such that the rotor is suspended magnetically during operation.

As in the case of magnetic hovertrains, the advantage of magnetic suspension is that the relative movement between the rotor and the stator is frictionless. This eliminates a source of malfunction, there is no wear and heat dissipation and additional noise production do not occur.

The uniformity and the mirror-symmetrical placing of the truncated conical surfaces ensures a symmetrical play of forces, both in respect of driving and the magnetic suspension of the rotor. This latter can hereby be active in any spatial position in stationary operation, and can also eliminate disruptions, for instance changes in position, in effective manner. The electronic unit comprises for this purpose a negative feedback co-acting with the electromagnets which effectively suppresses at their initial stage changes in position of the rotor resulting from external causes.

In a specific embodiment the device has the special feature that the rotor ring is assembled from two identical part-rings which each consist of a strip of material with the shape of a part of a circular arc, the free ends of which are connected to each other such that each strip has the form of the outer surface of a truncated cone, which thus modelled strips are connected with their outer circular peripheral zone to each other; and a third and optionally a fourth part-ring, each consisting of a strip of material which is curved to a round form and mutually connects the respective free circular inner edges and outer edges of the first two part-rings; and the end zones of the blades are connected to the third part-ring.

Particularly in the case of small fans with a diameter in for instance the order of magnitude of 0.2 m the device can advantageously have the feature that the rotor is manufactured by injection moulding of plastic. Very slender blades can hereby be used, this providing advantages from an aerodynamic viewpoint. Owing to the monolithic structure, or a structure with two parts joined together to form a whole, the rotor is nevertheless mechanically stiff and strong while the quantity of material to be used is limited.

In the case where the rotors have overlap in front or rear view, which is usually the case, the injection mould can be very complicated. There is nevertheless a wish to use this aerodynamically good structure. A considerable simplification can be obtained for this purpose with an embodiment in which the rotor is assembled from two parts manufactured by injection moulding and subsequently connected to each other, which parts are connected to each other over adjacent surfaces of the ring corresponding to the main plane of the ring, and also over adjacent surfaces of the hub parts.

According to a further aspect of the invention, the device has the special feature that each coil comprises: a stack of electrically insulating carriers disposed in register, each with at least one electrically conductive track present thereon which forms at least one winding of the coil, which tracks debouch on the outer side of the respective carriers and are connected to each other electrically such that the windings formed by the tracks together form the coil, which carriers have registered through-holes through which the ferromagnetic core extends.

Such a device can be embodied very compactly and with a great freedom of form.

A very practical embodiment has the special feature that the permanent magnets of each truncated conical surface are received in an adhesive strip adhered to this surface. It is hereby possible using very simple means and without the use of inserts in an injection mould or mould template to achieve in simple manner and with a high degree of accuracy that the permanent magnets are placed at exactly the intended positions.

The device preferably has the special feature that the core of each electromagnet comprises grains of niobium, iron, ferrite or other ferromagnetic material embedded in a plastic, for instance polyetherimide.

An improved control of the inlet medium flow can be obtained with an embodiment which is characterized by an inflow grill which is placed upstream of the inlet and which comprises a pattern of baffles placed and formed such that the channels bounded by these baffles have directions corresponding to the directions of the relevant local part-flows of the medium. So-called pre-rotation is eliminated with this structure.

In order to enable complete control of the rheological properties of the rotor, even at high medium flow rates, the embodiment is recommended in which the preferably very slender blades are connected under bias to the hub and to the ring.

Tests have shown that it is recommended that the number of blades amounts to at least 12-26.

The number of blades can be substantially greater in practice. Applicant has designed, built and tested devices wherein the number of blades of the rotor is in the order of 40.

According to a following aspect of the invention, the device is embodied such that at least the inner surface of the ring has a streamlined shape. A guiding of the medium flow flowing through the device is hereby achieved such that the occurrence of undesired vortices and turbulences, and thereby energy loss and noise production, is substantially precluded.

For the same technical reason the device can be embodied such that the end zones of the blades connect smoothly to the inner surface of the ring.

According to yet another aspect of the invention, the device can have the special feature that the frame comprises a guide ring for the best possible rheological guiding of the medium flow passing through the device, which guide ring has a smoothly curved surface which acts coaxially with the rotor and which has an annular recess with a form corresponding to the form of the rotor ring, the recess accommodating this rotor ring with some free clearance.

Using such a guide ring the profile of the medium flow through the device is favourably affected, whereby the rheological efficiency is greatly improved, undesired turbulences and vortices are prevented and the sound production is reduced substantially compared to the prior art.

Very important is an embodiment in which the upstream part of the active surface of the guide has a radial sectional form largely corresponding to a quarter of an ellipse, the longitudinal axis of which extends parallel to the central axis of the rotor.

According to yet another aspect of the invention, the device has the special feature that the flow guide has a form on the downstream side such that the downstream medium flow through the device is free of dead zones.

According to yet another aspect of the invention, the device comprises a stationary, substantially rotation-symmetrical nose element which is disposed fixedly relative to the frame or forms part of the rotor and which is disposed upstream relative to the hub and has an outer surface which widens from its front side to its rear side and which connects at its rear side to the hub in aerodynamically smooth manner.

Such a device is preferably embodied such that the longitudinal section of the outer surface has more or less the form of a parabola, the extreme of which is situated at the upstream end of the nose element.

In a determined embodiment the device has the special feature that the nose element is disposed stationary relative to the frame and is supported by the frame via spokes. The number of spokes is preferably kept as small as possible, for instance three, so as to influence the medium flow as little as possible.

For the same reason use is preferably made of a variant in which the spokes are formed rheologically.

For safety reasons the device can advantageously have the special feature that it is provided on its inlet side with a protective grill. This protective grill is preferably embodied such that it guides the flow on the basis of the local rheological conditions.

Very important is an embodiment in which the frame is provided with a collar of channels which via a collar of openings guide part-flows from the area of the downstream medium flow at increased pressure into the clearance between the ring and the walls of the cavity such that these part-flows flow along the poles of the electromagnets and the permanent magnets and thus cool these electromagnets and the permanent magnets and leave the clearance at reduced pressure in the area of the upstream medium flow. It should be understood that the part-flows move in counter-flow relative to the main flow of the medium.

Highly efficient use is in this way made of the flow which naturally tends to occur between the downstream area at increased medium pressure and the upstream area at reduced medium pressure. Bringing these areas into contact with each other via the channels and the clearance between the rotor ring and the walls of the cavity achieves in an effective manner that the induction motor/generator is effectively cooled.

The entry openings of the channels are situated some axial distance from the rotor ring. This prevents a heated medium part-flow fed back into the main medium flow on the upstream side from flowing into the entrance of said cavity again as cooling medium. The cooling of the induction motor/generator would hereby become less effective. This is the reason why the cooling channels take their infeed medium some axial distance from the downstream zone of the main medium flow.

This latter variant is preferably embodied such that the outflow zone of the part-flows has a deflection zone by which the part-flows are deflected such that they acquire a radial directional component and a longitudinal directional component in the direction of the medium flow through the device. This achieves that the outflowing cooling medium part-flow is injected into the main medium flow. This latter is not disrupted hereby to any appreciable extent and the heating of the main medium flow adjacently of the inner wall of the frame is negligible. A good control of the flow is achieved by applying a more or less cylindrical deflection surface adjacent to the outflow zone of the part-flows.

Care is taken under all conditions that the main medium flow is disrupted as little as possible and that in particular the inner wall of the frame and the third part-ring lie substantially in one cylindrical plane. It will be apparent that it is not possible to avoid the entry openings or mouth openings of channels disrupting the flow in small measure. The disruption of the medium flow can be limited to negligible proportions with a well-considered choice of the relevant shapes and geometries.

It can be advantageous, even in the above-mentioned embodiment in which the rotor is suspended magnetically during operation, to embody the device such that the rotor is supported by the frame via auxiliary bearing means. This is not strictly necessary during operation, but it can be advantageous, for instance for maintenance purposes or in the case of a power failure, to be able to rotate the rotor by hand without any electrical actuation by the induction motor/generator being necessary for the purpose. High requirements are not set for the bearing means in the case of magnetic suspension. The bearing means can be deemed as technically and operationally secondary. Because the bearing means are hardly or not loaded mechanically during operation, the bearing means have an extremely long lifespan and it is extremely unlikely that they will ever cause a malfunction. The bearing means are preferably embodied such that they do not affect the rheological behaviour of the flow through the rotor.

It is of great importance for the invention that the aerodynamic properties of the device are optimized to the greatest possible extent. An important object of the invention in this respect is to embody the device such that the occurrence of undesired vortices and turbulences is prevented as far as possible. Such vortices and turbulences cause losses and undesirable noise-like sounds.

In respect of the above the invention provides a device of the specified type in which the peripheral edge has on its outflow side a convergent annular protrusion which is formed by two mutually connecting concave surfaces which on their sides remote from the protrusion transpose smoothly into the largely toroidal convex other surface of the peripheral edge.

A further improvement is obtained with an embodiment in which the annular protrusion protrudes little or not at all beyond the plane defined by the furthest downstream part of the convex surface of the peripheral edge.

A spectacular improvement is realized with an embodiment in which the downstream part of the hub has a gently tapering rotation-symmetrical form, the end surface of which has an encircling concave form such that the peripheral edge is sharp and in the centre is situated a tip, the apex of which lies at least roughly in the plane of the peripheral edge.

A specific embodiment has the special feature that electric heating means are added to the blades so that the device can serve as heating device, the heating means being supplied with alternating current which comes from the secondary coil of a rotary transformer added to the rotor, the primary coil of which is added to the frame and is supplied by a source of alternating current. A heating device with high efficiency is hereby obtained. The heating function can be switched off by breaking the primary or secondary electrical circuit of the transformer.

According to this aspect of the invention, the device can be used as component of a hairdryer, a space heater or other application wherein a heated airflow must be generated.

Known are hairdryers and space heaters which make use of a fan which carries cold air through resistance wires heated by electrical energy. Such a generally known and usual embodiment is embodied such that indrawn unheated air is blown through a pattern of heating wires, which heating wires are heated to a high temperature, for instance in the order of 200° C., by passage of electric current therethrough.

Such a heating device has a substantial air resistance which has to be overcome by the fan motor.

In addition, the temperature of the heating wires is high. This results in radiation losses and fire hazard, for instance in the case where the fan function fails.

Because of their high temperature the resistance wires are further subject, certainly in the longer term, to oxidization. Ionization of the air and ozone formation can likewise occur because of the high temperature.

As a result of the presence of the heating wires local turbulence occurs which could result in a hissing sound which is often perceived as irritating.

An accumulation of dust, fibres, filaments carried by the air, hair and oxidizable constituents can further occur on the heating wires. In combination with the high temperature of the heating wires, odour formation, soot formation and fine dust can occur.

The heating device of the above described type according to the invention has these drawbacks to considerably less extent, if they occur at all.

The invention can make use of a large heated surface, whereby the temperature of the heating means can remain limited, for instance to 70-80° C.

Through the use of a rotary transformer according to the invention no use is made of sliding contacts and the like which must transmit relatively large currents and as a result are subject to wear, corrosion due to sparking, and the like. It should be remembered that a hairdryer and a usual space heater for household use produce heating capacities in the order of 1.5-2.5 kW.

It will be apparent on the basis of the foregoing that a heating device of the above described type of the invention has superior properties.

This device can be embodied such that the electric heating means comprise wires, tracks or at least one cover layer of resistance material, such as constantan or inconel, present on the surfaces of the blades.

Particularly advantageous is an embodiment in which the wires, the tracks or the at least one cover layer of resistance material has an outer surface corresponding substantially exactly to the ideal outer surface of each associated blade. The heating means are thus placed recessed or embedded into the material of the skin of the blade. Any increase in the air resistance resulting from the presence of heating means is hereby reduced to zero, and the sound production does not increase either compared to a rotor with blades not provided with heating means.

The invention further relates to a frame which comprises spaces for accommodating a number of devices according to the above specification, which devices can be slid into and out of the spaces, wherein electric coupling means are added to each space and to each device, whereby each inserted device can be coupled electrically to the electronic power supply unit. An advantage of the assembly according to the invention with a number of devices according to the invention is the extremely compact structure. It should be understood that in known assemblies of fans which must create an airflow through a heat exchanger placed downstream it is important that the outlet airflow is largely free of rotation components. This is realized according to the prior art with fans which co-act pairwise in cascade with each other, together allow through one part-flow and rotate in mutually opposite directions. Due to their aerodynamically better optimized design the fans according to the invention can rotate substantially more slowly at the same flow rate. As a result the outflowing airflow has a negligible rotation. This clearly shows a great advantage of the structure according to the invention. Cascading is not necessary and this results in great space-saving in combination with a lower weight and a substantial cost-saving. The advantage of the substantial absence of rotation components in the outflowing airflow as according to the prior art is nevertheless preserved. It is also the case for this embodiment that the sound emission is reduced very substantially by an amount in the order of magnitude of up to 20 dB SPL. It is also important that particularly the inlet, but also the outlet, are modelled such that the aerodynamic effectiveness is maintained despite the inlet airflows and the outlet airflows being at small mutual distances.

It is possible in practice according to the invention to envisage use being made of a per se known matrix arrangement of devices. These devices can for instance be disposed in a pattern of 2×3 by sliding thereof into a correspondingly formed frame. In such an embodiment each individual device can simply be slid out, even during operation, and for instance exchanged for a replacement device. Switching off the whole assembly of devices according to the invention is hereby unnecessary.

The device also relates to a manned or unmanned aircraft, comprising
 a frame;
 at least one device according to claim 1 supported by said frame and serving as propeller or lifting rotor,
 optionally a receiver for feeding to the electronic unit control signals coming from control signals transmitted by a remotely placed transmitter, and
 an energy source, for instance a rechargeable battery, which provides the electronic unit with electrical energy during operation.

A preferred embodiment has the special feature that the number of devices serving as propeller or lifting rotor is even, and the rotors of these devices have rotation directions opposed pairwise to each other.

On the basis of the foregoing technical specification it will be apparent that, other than in the prior art with central motors, according to the invention it is not the motor which is of primary concern in the design and that the rheology follows therefrom, but that on the contrary it is precisely the rheology which is the primary concern, and the overall system of the device, including the motor, can be optimized to far-reaching extent, also as a result of the superior induction motor/generator system.

As generally known, a drone is an unmanned aircraft which has received regular media attention in recent years because of its military applications, but which also and particularly can be used for inspection purposes, for instance monitoring and inspecting traffic situations, large agricultural areas and the like. The propeller structure or lifting rotor structure with induction electric motor in the ring in accordance with the teaching of the invention is highly suitable for this purpose. The drone structure per se can be selected on the basis of generally known aerodynamic design principles. Other than in the case of known drones, which in most cases operate with combustion engines, use is made according to the invention of propellers and/or lifting rotors with electric drive. It is noted that it is important that the electrical energy source, so in particular one or more rechargeable batteries, preferably has a highly favourable ratio of the amount of energy to be stored and the weight. The batteries do after all form dead weight and it is important to select the most advanced types of battery. Operation with a generator set, wherein an electric generator is driven by a combustion engine, could optionally be considered. The generator set provides for the power supply to the induction motor.

An aircraft according to the invention is extremely low-noise. This is very important in respect of noise nuisance for humans and animals.

Owing to the higher efficiency than in the prior art which can be realized with the invention the aircraft according to the invention can remain airborne substantially longer.

In an important variant the aircraft has the feature that the or each device is tiltable in two independent directions under the control of the electronic unit such that, in addition to a vertical lift force, a horizontal thrust is also obtained during operation.

The tiltability in two independent directions can be realized by two stepping motors disposed at an angle of 90° relative to each other and controlled by the electronic unit, which is in turn controlled by a receiver which receives its signals radiographically from a control station. This control station provides for the control of all functions of the aircraft apart from several autonomous functions or navigation on the basis of an automatic pilot.

According to an important aspect of the invention, the aircraft has the special feature that the frame has a peripheral zone with an aerodynamic form such that an additional lift force occurs during horizontal displacement.

The above described embodiment can advantageously be embodied such that the peripheral zone has on its underside a convergent annular protrusion which is formed by two mutually connecting concave surfaces which transpose on their sides remote from the protrusion into the largely toroidal convex other surface of the peripheral zone. A substantial improvement in the aerodynamic efficiency is hereby obtained, in combination with an increased lift force.

A still further improvement is obtained with an embodiment in which the annular protrusion protrudes little or not at all beyond the plane defined by the lower part of the convex surface of the peripheral zone.

The best embodiment in the light of present understanding is that in which the downstream part of the hub has a rotation-symmetrical form tapering slightly in the flow direction, the end surface of which has an encircling concave form such that the peripheral zone is sharp and in the centre is situated a tip, the apex of which lies at least roughly in the plane of the peripheral zone. On the outflow side the turbulences and vortices causing loss are reduced to completely negligible proportions. The sound production is hereby reduced still further and the aerodynamic efficiency increased still further.

In a specific embodiment the aircraft can have a special feature that the energy source comprises solar cells.

The invention will now be elucidated with reference to the accompanying figures. In the drawings:

FIG. 10B shows a helicopter with two lifting rotor devices according to the invention in a second embodiment;

FIG. 17 shows a top view of an adhesive strip with permanent magnets which can be adhered to the truncated conical surfaces in the peripheral direction of the rotor according to for instance FIG. 1;

FIG. 18 shows a perspective partial view of half of two rotor halves manufactured by injection moulding prior to assembly thereof to form one rotor.

FIG. 21 shows a diametric section through a further embodiment in which the peripheral zone has a form such that the flow pattern is greatly improved;

FIG. 22 shows a diametric section through a variant in which the flow pattern is improved still further;

FIG. 23 shows on larger scale the detail XXIII according to FIG. 22;

FIG. 24 shows a schematic, locally cut-away perspective view of a rotary transformer;

FIG. 25 shows a cross-section through a fan-rotor with heating means powered by a rotary transformer.

Figure 1:
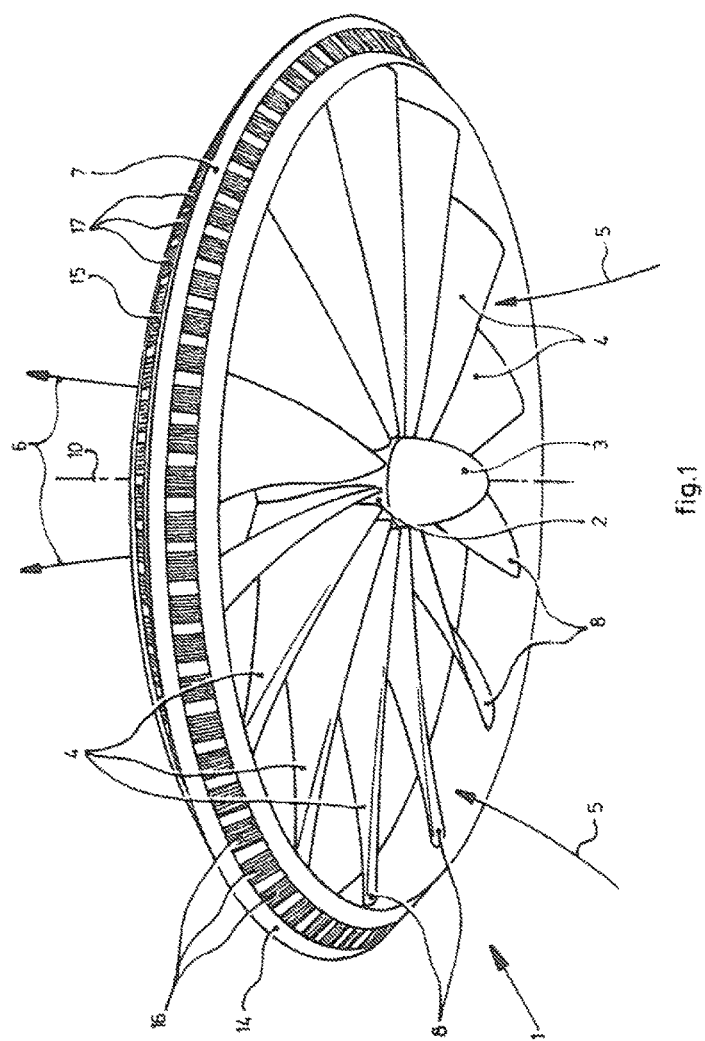
FIG. 1 shows a perspective view of a rotor according to the invention.

FIG. 1 shows rotor 1 of a rotary device according to the invention for converting one form of energy to another form of energy, these forms of energy being electrical energy and the energy of a flowing medium. Rotor 1 comprises a central hub 2 bearing on the entry side a more or less parabola-shaped nose element 3 as well as a number of blades 4 connected to hub 2 in angularly equidistant arrangement and extending at least more or less in radial direction, which blades 4 all have the same form, i.e. a form such that a relation is obtained between the flowing medium, designated on the entry side with 5 and on the exit side with 6, and the rotation of rotor 1.

Rotor 1 further comprises a concentric ring 7 to which the end zones 8 of blades 4 are connected.

Figure 3A:
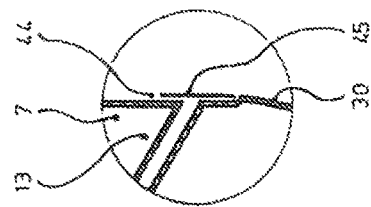
FIG. 3A shows the detail IIIA according to FIG. 3.
Figure 3:
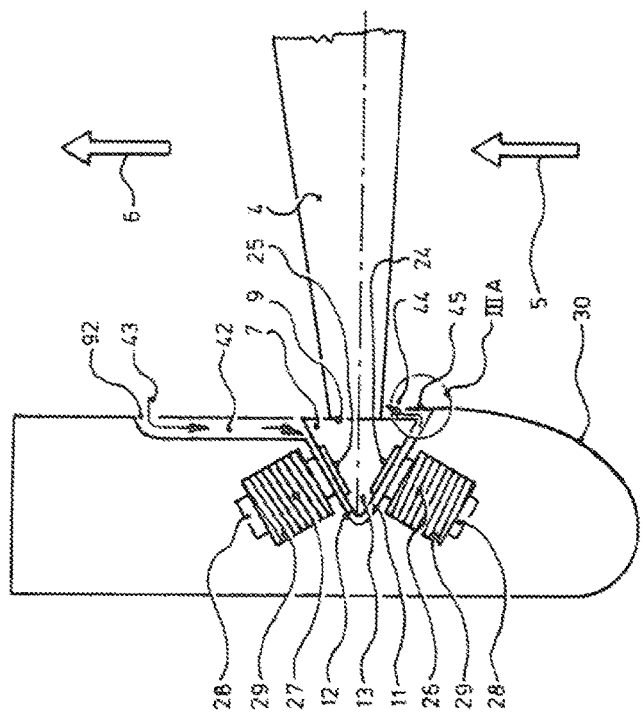
FIG. 3 shows the detail III according to FIG. 2.

As shown particularly clearly in FIG. 3, the ring 7 in this embodiment has a radial section with the general shape of an isosceles triangle, the base 9 of which extends parallel to the central axis 10 (FIG. 1), also the rotation axis, of rotor 1 and the sides 11, 12 of which converge toward the apex 13 lying radially furthest outward of triangle 13.

Rotor 1 according to FIG. 1 is designed such that it is suitable for use as fan or as rotor of a wind turbine. The blades have an aerodynamic form suitable for this purpose.

Added to each of the truncated conical surfaces 14, 15 corresponding to said sides 11, 12 are permanent magnets which are placed angularly equidistant and the respective poles 16, 17 of which debouch on said surfaces.

As shown clearly in FIG. 1, the magnets are placed in such that the groups of poles 16 are offset half a pitch distance relative to poles 17.

Figure 2:
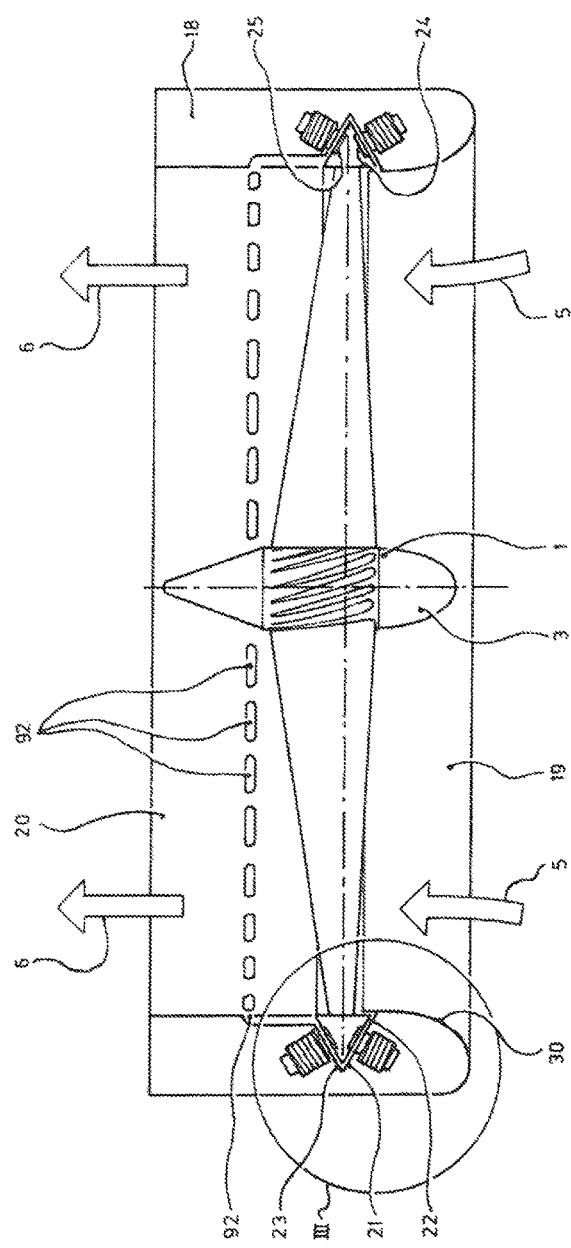
FIG. 2 shows an axial section through a device according to the invention.

FIGS. 2, 3 and 3A show an exemplary embodiment of rotor 1 which is suspended magnetically during operation in a rotation-symmetrical medium guide 18 with an inlet opening 19 and an outlet opening 20. Ring 7 is received fittingly with clearance in a triangular encircling recess 21. The respective poles 24, 25 of respective electromagnets 26, 27 debouch on the two corresponding surfaces 22, 23 of recess 21 which each take the form of a truncated cone, wherein poles 24, 25 of each collar have the same mutual angular distance as poles 16 and 17 of the two collars of poles of rotor 1. Each electromagnet 26, 27 comprises a core 28 and a coil 29.

It is important for the magnetic suspension that the ring has two truncated cones which are the same but oriented in opposite directions. The desired balance of forces can hereby be achieved in forward and backward direction.

The arrangement is such that ring 7 with the permanent magnets with poles 16, 17 and the frame or the medium guide with electromagnets 26, 27 together form an annular induction motor or an electric generator.

Not shown is that an electronic unit is added to electromagnets 26, 27 which is configured to supply electromagnets 26, 27 with alternating currents such that, due to the electromagnetic interaction between the electromagnets and the permanent magnets, the rotor is driven rotatingly, and which in this case is configured to convert the electric currents induced in electromagnets 26, 27 by throughflow medium during rotating drive of rotor 1 to a form of electric current suitable for a user, for instance for exporting back to the electricity grid.

Figure 4:
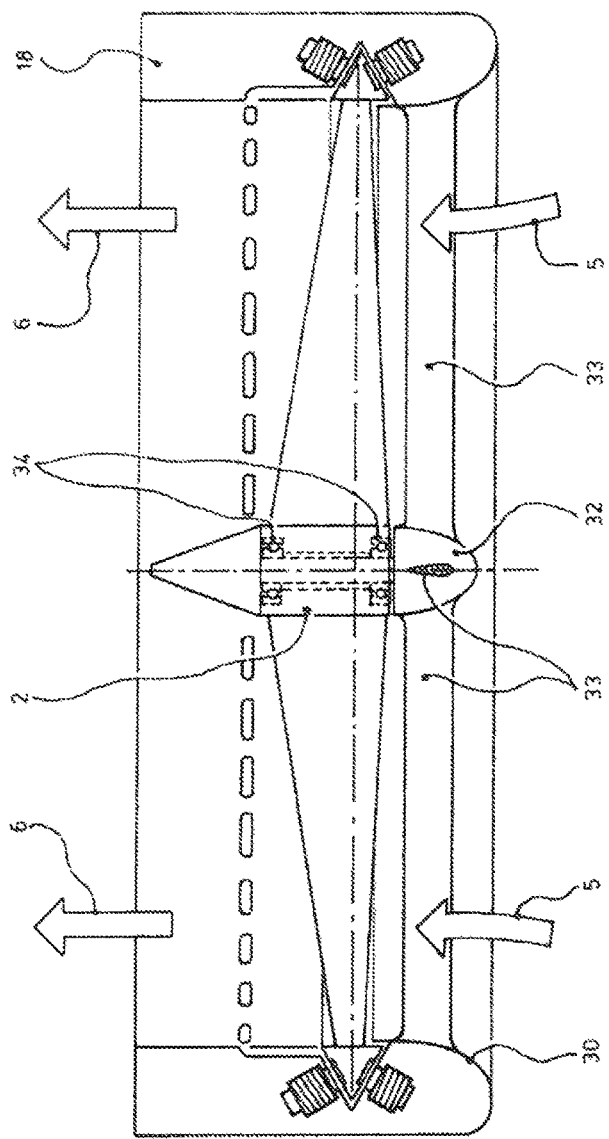
FIG. 4 shows a view corresponding to FIG. 2 of a variant in which positioning bearings are present in the area of the hub.

The upstream part 30 of the active inner surface 31 of guide 18 has a radial sectional form as shown in FIGS. 2, 3 and 4 which largely corresponds to a quarter of an ellipse, the longitudinal axis of which extends parallel to the central axis 10 of rotor 1.

In the embodiment according to FIGS. 1 and 2 the more or less semi-elliptical nose cone 3 is fixedly connected to hub 2 and so forms part of the rotor.

FIG. 4 shows an embodiment in which a nose cone 32, which has the same form as nose element 3, is supported via four spokes 33 by medium guide 18. Connected to nose element 32 are ball bearings 34 which position the hub 2 relative to the frame, i.e. the medium guide 18.

As described above, rotor 1 is preferably suspended magnetically relative to medium guide 18 during operation. Under these conditions the bearings 34 are unnecessary. As a result of the magnetic suspension, particularly the axial forces to which prior art bearings are subjected are practically absent. However, when not in use the surfaces 14 or 15 of ring 7 do lie against the corresponding surfaces 22, 23 of recess 21. It is practical, for instance for maintenance purposes, for an engineer to be able to rotate the rotor by hand. This can take place easily in the embodiment according to FIG. 4, since under these conditions the rotor 1 is supported in more or less freely rotatable manner by bearings 34.

Figure 5:
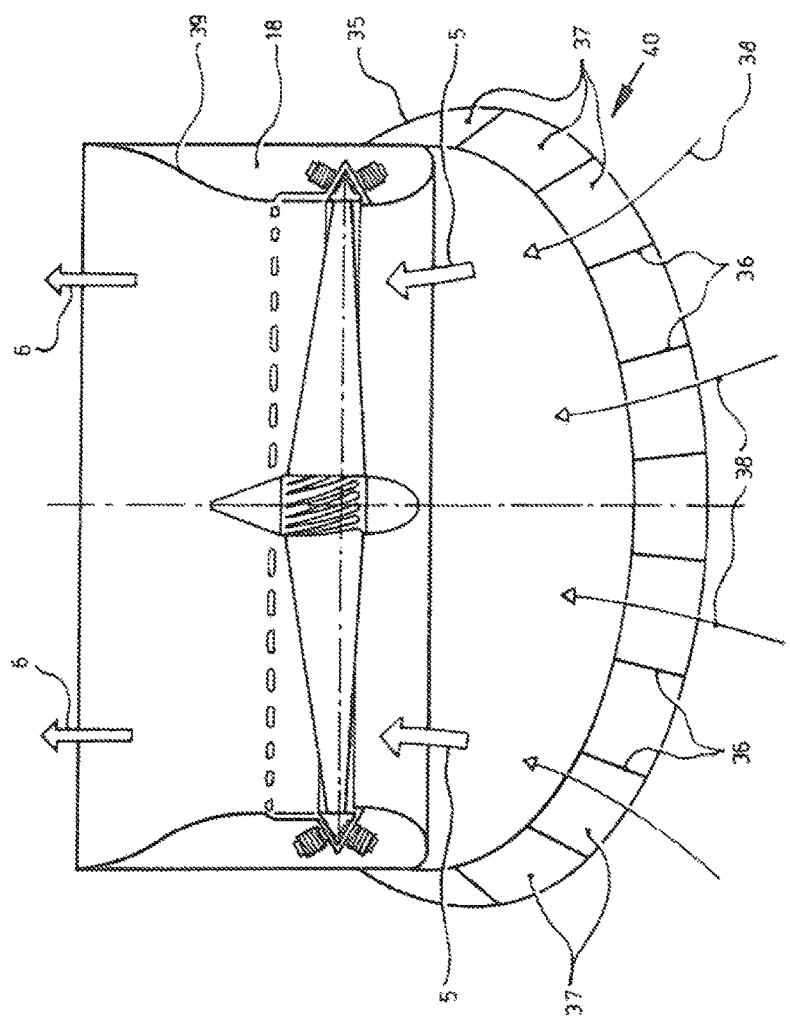
FIG. 5 shows an axial section through an embodiment with a medium guide and an inflow grill.

FIG. 5 shows an embodiment wherein the basis corresponds to that according to FIG. 2. Frame 18 is however provided in this embodiment with an inflow grill 35 which is placed upstream of inlet opening 19 and which comprises a pattern of baffles 36 placed and shaped such that the channels 37 bounded by these baffles 36 have directions corresponding to the directions of the associated local part-flows 38 of the medium.

In the embodiment according to FIG. 5 flow guide 38 further has a guide surface 39 on the downstream side with a shape such that the downstream airflow 6 through device 40 is free of dead zones.

All embodiments according to FIGS. 1, 2, 3, 4 and 5 have in common that the number of blades 4 amounts to fourteen, that inner surface 41 of the ring is streamlined and that end zones 8 of blades 4 connect smoothly to inner surface 41 of ring 7. Blades 4 are connected under bias to hub 2 on one side and to ring 7 on the other.

In the embodiment according to FIG. 4 spokes 33 have an aerodynamic or generally rheological form.

The embodiments according to FIGS. 2, 3, 4 and 5 further have in common that frame 18 is provided with a collar of channels 42 with inflow openings 92 which guide medium part-flows 43 from the area of the downstream medium flow at increased pressure into the clearance between ring 7 and the walls of recess 21 such that these part-flows 43 flow along poles 16, 17 of electromagnets 26, 27 and poles 24, 25 of the permanent magnets and thus cool these electromagnets 26, 27 and the permanent magnets and leave the clearance in the area 44 at reduced pressure.

Recess 18 has in the area of outflow zone 44 an encircling deflection surface 45 by which the part-flows 43 are deflected such that they acquire a radially inward directional component and a longitudinal directional component in the direction of the medium flow through the device.

Figure 6:
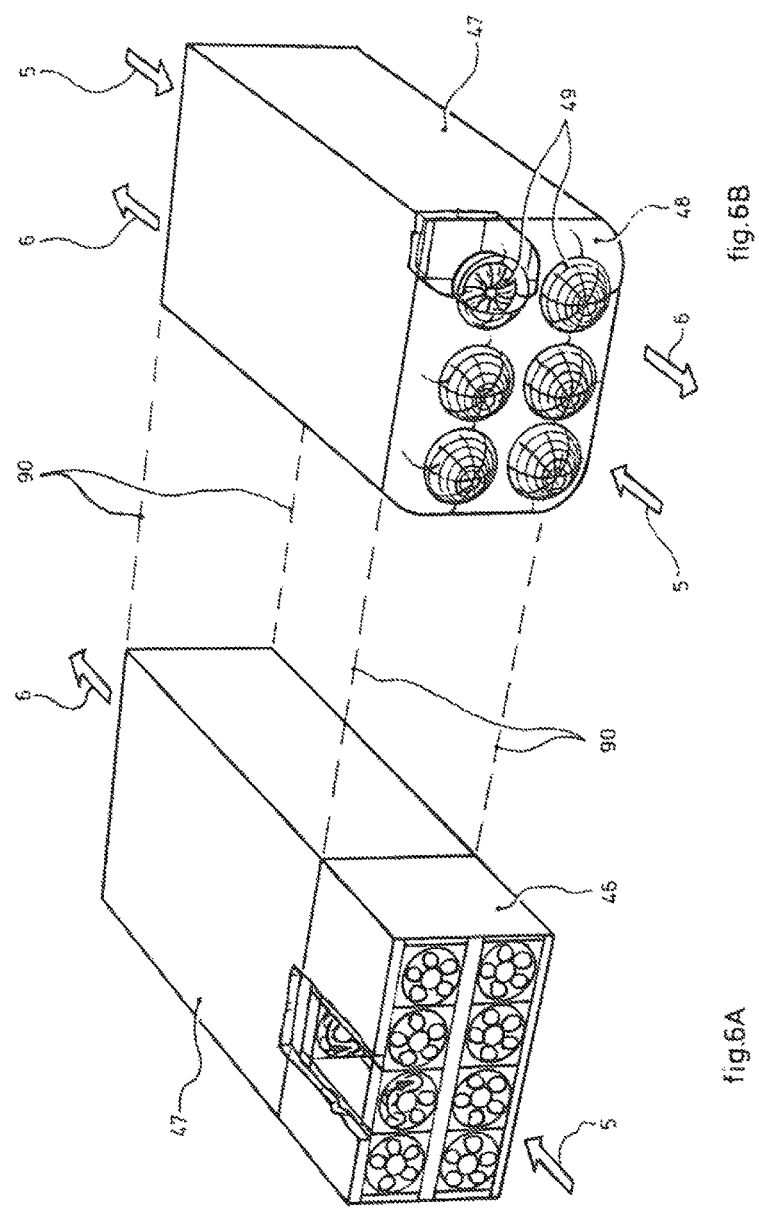
FIG. 6A shows a partially cut-away perspective view of an assembly of fans according to the prior art.
FIG. 6B shows a perspective view of a functionally similar assembly of fans according to the invention, wherein broken lines indicate the dimensions relative to FIG. 6A.

FIG. 6A shows a prior art fan assembly 46 with an arrangement of 2×4 fans, to each of which fans is added a second fan with opposite rotation direction placed downstream. The rotation component is hereby effectively removed from the outlet flow of the fans.

It will be apparent from FIG. 6A, which represents the prior art, that the space taken up by the sets of cascaded fans is substantial compared to the volume of the object 47 for cooling, for instance a server area.

When the space taken up by assembly 46 is compared to the space taken up by fan assembly 48 according to the invention on the basis of the four parallel broken lines as shown in FIG. 6B, it will be immediately obvious that the space taken up in this latter case is very substantially smaller. Only six fans, for instance of the type as shown in FIG. 5, are necessary according to the invention instead of sixteen prior art fans. All outer edges of fan assembly 48 and the edges adjoining the actual fans are rounded such that a very smooth and controlled laminar airflow is ensured. Although owing to the low rotation speed of the fans the rotation component on the outflow side is not zero, it is technically negligible and the sound levels generated by the fans during operation are in the order of magnitude of 20 dB SPL lower than according to the prior art as shown in FIG. 6A.

Fan assembly 48 comprises spaces for accommodating the six fans, which for the sake of convenience are all designated 49. Are these fans can slide into and out of the associated spaces, wherein electric coupling means are added to each space and to each fan, whereby each inserted fan can be coupled electrically to the above described electronic unit (not shown).

Figure 7:
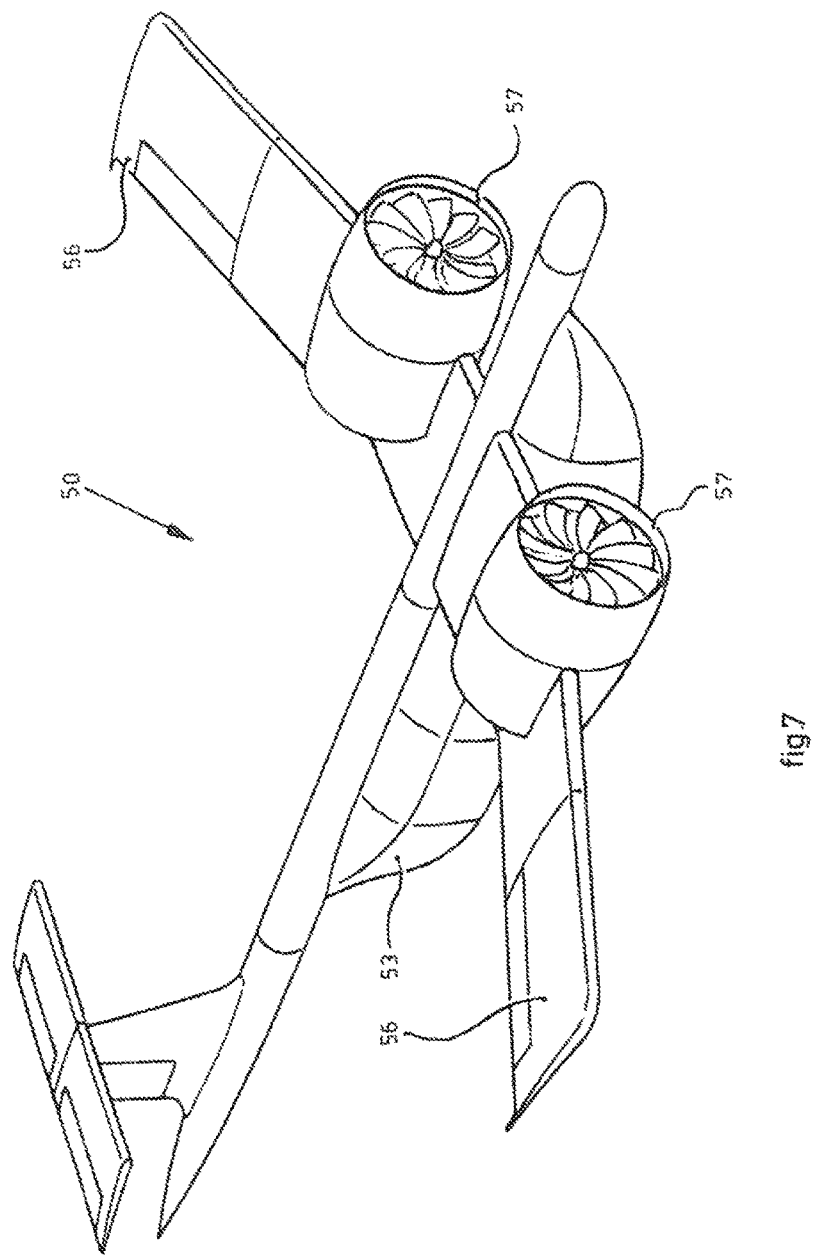
FIG. 7 shows a perspective view of a drone in a first exemplary embodiment.
Figure 8:
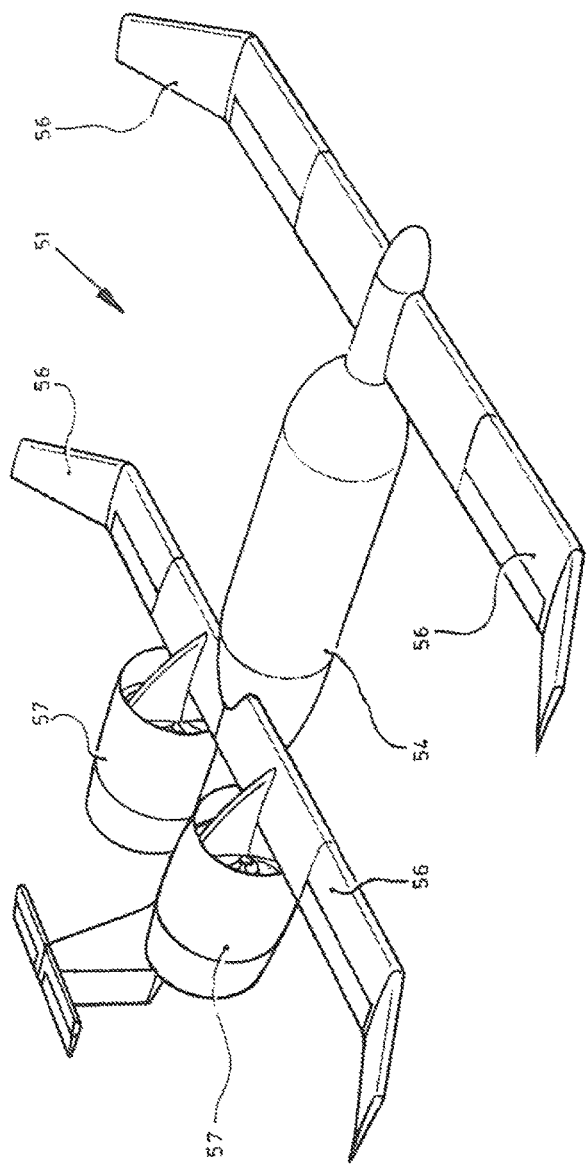
FIG. 8 shows a perspective view of a drone in a second exemplary embodiment.
Figure 9:
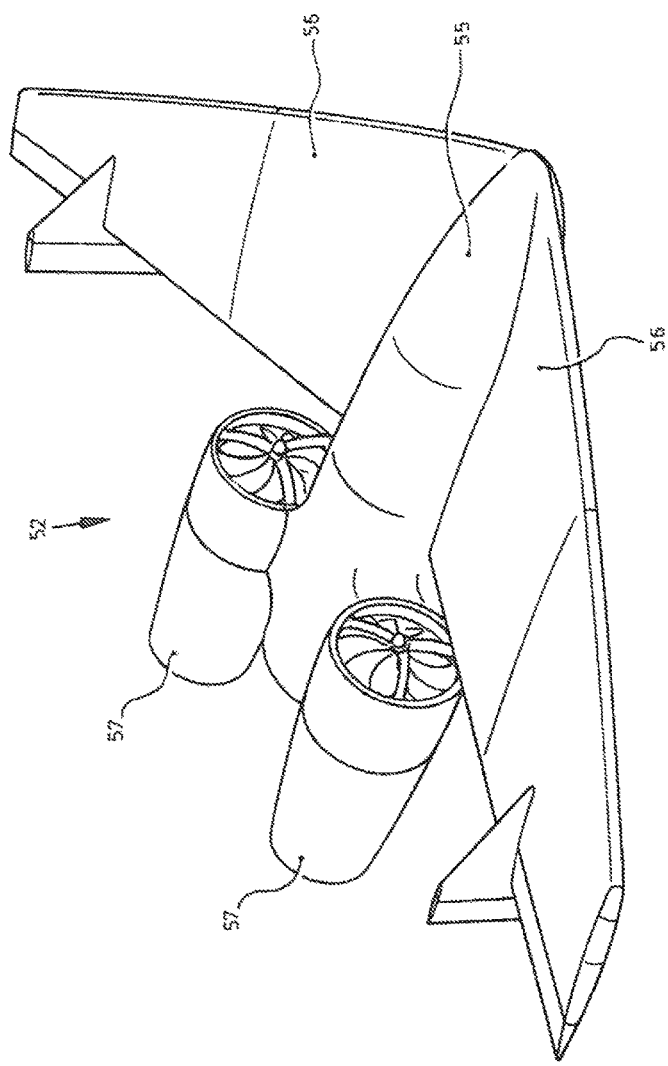
FIG. 9 shows a perspective view of a drone in a third exemplary embodiment.

FIGS. 7, 8 and 9 show three exemplary embodiments of drones. These are small unmanned aircraft which can be remotely controlled and carry for instance cameras and the like for the purpose of inspecting farmland, carrying out investigations by police units, or traffic surveillance.

These three drones according to FIGS. 7, 8, 9 designated with reference numerals 50, 51 and 52 have in common that they have a fuselage 53, 54, 55 which is configured to carry for instance the inspection equipment. Each drone further comprises wings, all designated with 56, and two propellers of the type according to the invention. These propellers are all designated with reference numeral 57. The foremost zone of each propeller can correspond to the embodiment of the device according to the invention as shown in FIG. 4, while a lengthened guide connects to the rear zone and ensures that flowing air is able as far as possible to impart a forward thrust to drone 50, 51, 52.

Figure 10A:
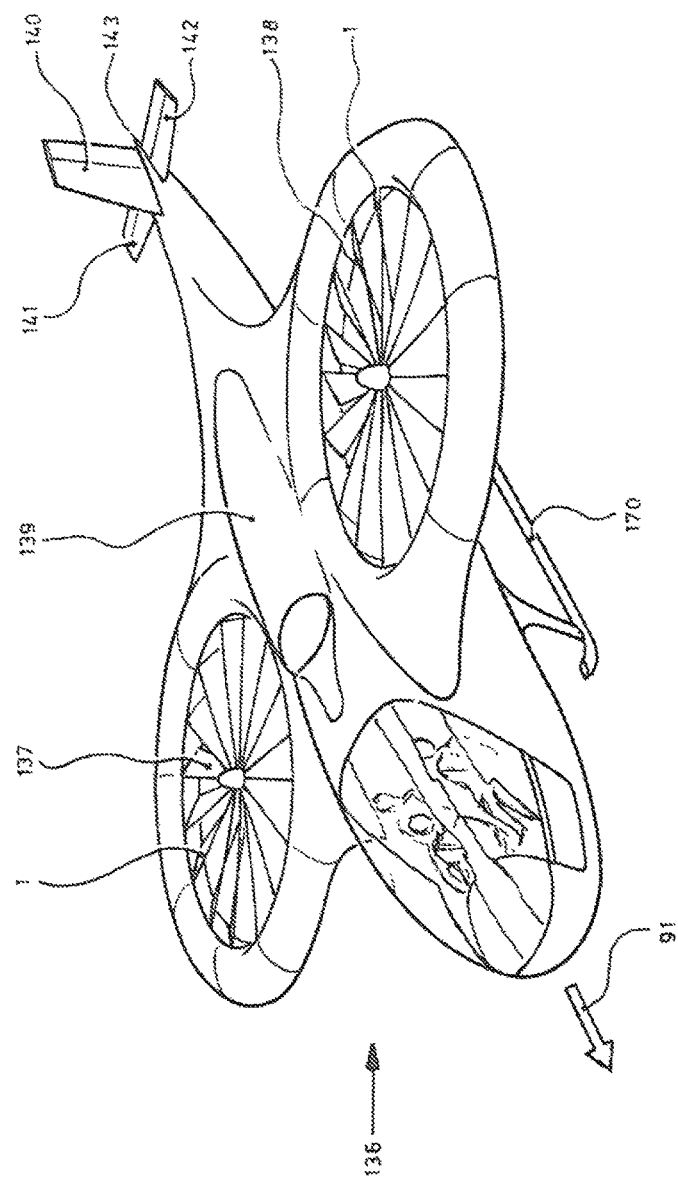
FIG. 10A shows a helicopter with two lifting rotor devices according to the invention in a first embodiment.

FIG. 10A shows a perspective view of a helicopter 136 with two lifting rotor devices 137, 138 according to the invention. For the purpose of supporting the forward thrust the helicopter also comprises a schematically designated jet engine 139.

Figure 11A:
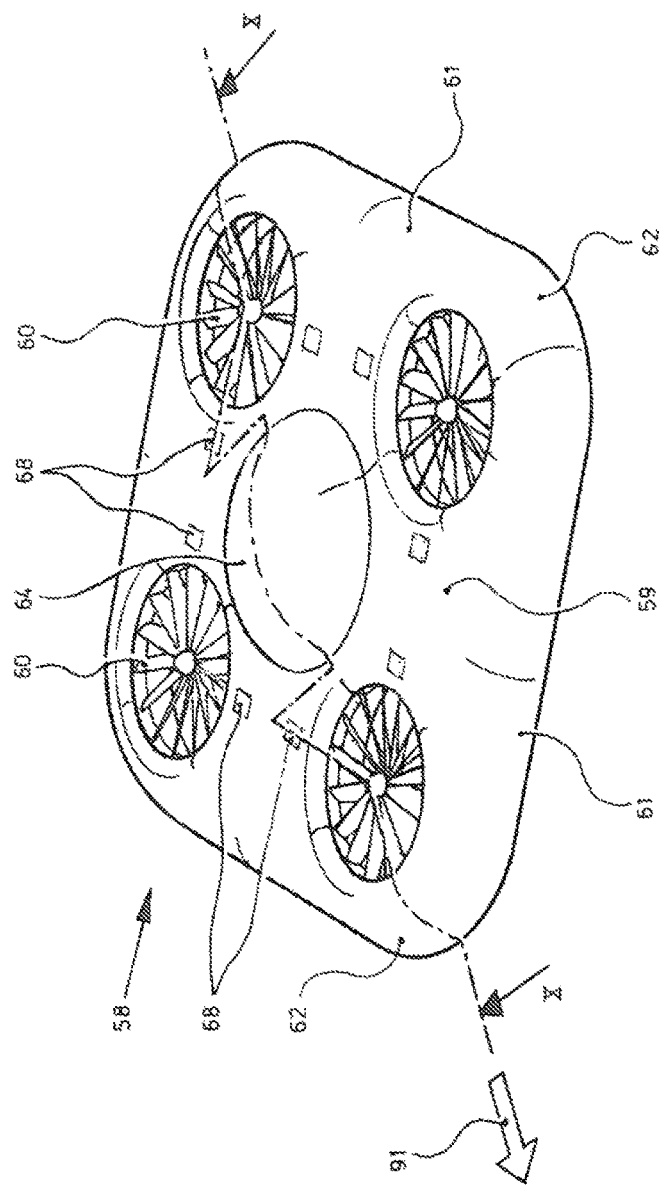
FIG. 11A shows a helicopter platform or quadcopter according to the invention which is equipped with four lifting rotor devices according to the invention.
Figure 11B:
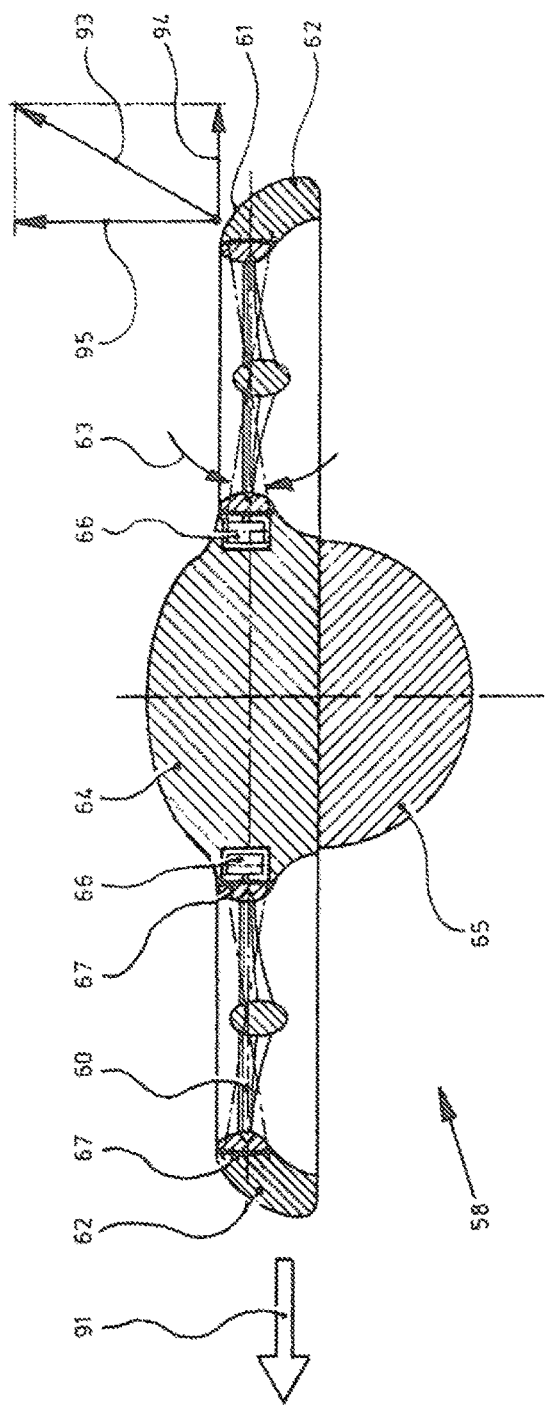
FIG. 11B shows the cross-section along the broken line X-X through the quadcopter according to FIG. 11A.

The lifting rotor devices 137 and 138 can be of type applied in quadcopter 58 according to FIGS. 11A and 11B, with the proviso that the lifting rotor devices 137 and 138 must be configured to lift a heavier load and are therefore driven with greater power, have a larger diameter and operate at a higher rotation speed.

Connected to jet engine 139 is an electric generator (not shown) which serves to supply power to the lifting rotor devices 137, 138 via a computer-controlled electronic control unit.

In the embodiment according to FIG. 10A the helicopter 136 has a vertical tail surface 140 and two horizontal tail surfaces 141, 142. The outlet of jet engine 139 is situated at the rear end 143.

The helicopter according to FIG. 10A is designed such that it is suitable for speeds up to a maximum of 250-300 km/h.

Figure 10C:
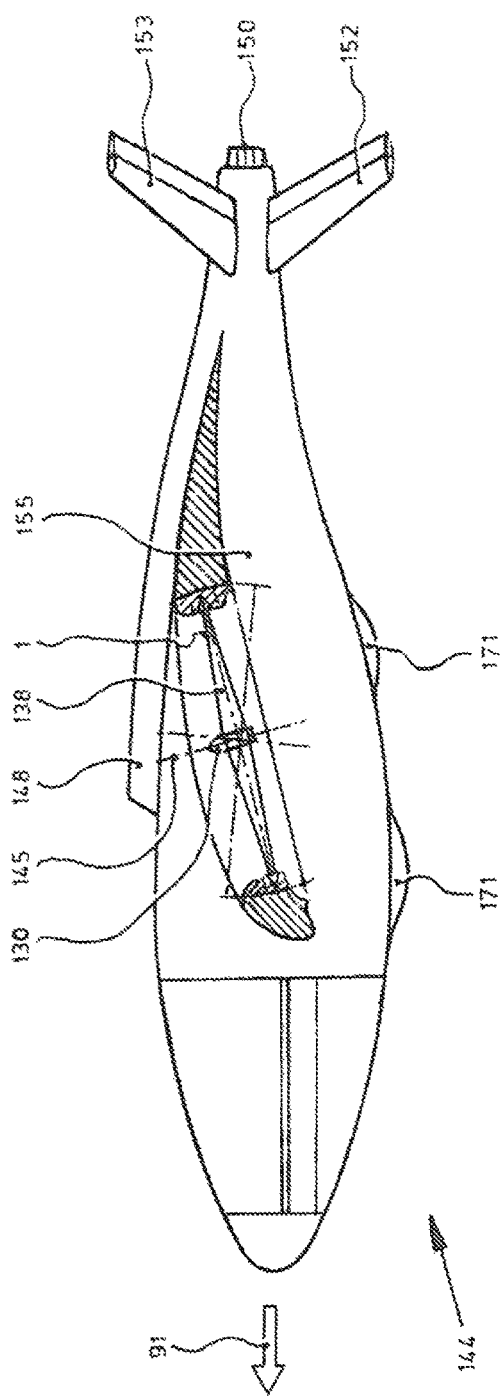
FIG. 10C shows a cross-section of the helicopter according to FIG. 10B through the wing with rotary device close to the fuselage.

FIGS. 10B and 10C show a helicopter 144, the fuselage 155 of which displays a high degree of rotation symmetry. Such a shape contributes toward a very low air resistance, also in the case where the horizontal speed in the direction 91 is high. The target maximum speed is in the order of magnitude of 500 km/h.

Other than in the embodiment according to FIG. 10A, the lifting rotor devices 138 in the embodiment according to FIGS. 10B and 10C are not placed horizontally but incline forward through an angle of about 10°. This is indicated by the rotation axes 145 of rotors 1 which extend at 10° to the vertical. As shown schematically in FIG. 10C, rotors 1 can pivot through an angular range of about 30° in total. The maximum angle of inclination to the rear amounts to about 5° and the maximum angle of forward inclination amounts to about 25°. A forward thrust can hereby be obtained which is substantially higher than with the "classical" horizontal arrangement according to FIG. 10A.

During flight the stability is ensured by computer control through dynamic control of the stepping motors (see FIGS. 11A and 11B and the associated description) for pivoting the lifting rotor devices 137, 138 in two independent directions.

It will be apparent that it is also of great importance that the annular structure 146 is modelled such that, in the case of a forward speed as according to arrow 91, the lift realized by this generally annular wing structure 146 is as great as possible.

Use is preferably made for this purpose of a structure such as the annular frame 124 with the specific aerodynamic profile shown in FIG. 23. Reference is made to this figure for the description hereof.

Of further importance is the fact that helicopter 144 is provided with two jet engines 147, 148 with outlets 149, 150. An electric generator is added to each of the jet engines 147, 148. In the case of possible failure of one of the jet engines the lifting rotor devices can still be driven electrically, albeit with less power. This enhances safety.

Helicopters 136 and 144 need not be provided with an anti-rotation rotor in the tail zone. As a result they are in principle about 15% more energy-efficient than usual helicopters and they make considerably less noise. The anti-rotation rotor, as irksome disruptive factor in respect of the aerodynamic properties of the helicopter as a result of asymmetrical airflows in transverse direction, is moreover hereby eliminated.

It is finally noted that helicopter 144 comprises on its rearmost zone four tail surfaces 151, 152, 153, 154 disposed in the form of a cross at 45°. This guarantees great stability, even at a high speed.

FIGS. 11A and 11B show a quadcopter 58. This quadcopter comprises a more or less square plate-like frame 59, all corners and edges of which have a rounded form.

Frame plate 59 carries four devices 60 according to the invention which serve in this embodiment as lifting rotors.

As in the fan assembly of FIG. 6B, all relevant corners and edges are embodied such that an aerodynamically efficient shape is obtained. An important consideration here is that the airflows generated by the lifting rotors may not interfere with each other to any appreciable extent.

There is another reason why the four edges 61 and the corner zones 62 mutually connecting these edges also have a rounded shape. These shapes are designed such that in the case of a horizontal movement of quadcopter 58 the frame plate 59 is subjected, in the manner of an aircraft wing, to a lift force as a result of its horizontal speed. The quadcopter can in this way remain airborne with a relatively low engine power during its horizontal movement. The flight direction is indicated with an arrow 91.

FIG. 11B shows the shape of corner zones 62 with which the described effect is realized.

FIG. 11B likewise shows schematically that lifting rotors 60 are pivotable relative to the main plane of frame plate 59. The pivoting range is indicated with arrows 63.

Situated in the central part of quadcopter 58 is a compartment 64 in which the electronic unit is housed, while the batteries, sensors, cameras and other load to be carried are accommodated in the compartment 65 located thereunder. A low centre of gravity is realized with this construction. This contributes toward the stability of quadcopter 58 during flight.

Pivoting a minimum of one of the lifting rotors 60 out of the main plane, though preferably all four at the same angle, achieves that the quadcopter is not only subjected to a vertical lift force but also a force with a horizontal component, whereby the quadcopter begins to move in horizontal direction. The described streamlined form is of essential importance, and certainly when reaching substantial speeds.

In FIG. 11B an arrow 93 indicates a force directed obliquely upward which is caused by the combination of the flying speed in the direction 91 and the specific aerodynamic form of edges 61. The occurrence of this obliquely upward directed force 93 is generally known per se from aerodynamics. Aircraft wings, rotor blades of wind turbines and the like are designed such that the path length of the air flowing along the convex upper side of the associated profile is greater than that on the concave lower side of the profile. An upward directed force occurs as a result during a horizontal movement.

The force 93 can be separated into a horizontal force component 94 and a vertical force component 95. Seen over the whole periphery, the horizontal force components 94, shown only toward the right-hand side in the schematic view of FIG. 11B, cancel each other out; this is because forces in the opposite direction occur on the left-hand side. The vertical force components 95 likewise occur over the whole of the relevant surfaces and add together. A substantial lift is hereby obtained as a result of the horizontal speed in direction 91.

This lift can be very substantial and even reach values in practice which are greater than the lift realized by the difference in air pressure generated by the rotation of the lifting rotors 60. It will be apparent that particularly for lifting rotor devices of the type according to the invention this aspect can be of exceptionally great importance since on the basis hereof a great upward force can be realized with a relatively limited power during flight.

Anticipating the discussion of FIGS. 20, 21, 22 and 23, attention is now drawn to the fact that the principles outlined, except for the lifting rotor devices, can also be important in the case of for instance fans. A comparison of the respective FIGS. 20, 21 and 22 particularly shows that, as a result of the specific measures characteristic for the relevant exemplary embodiments, the flow pattern becomes increasingly better in the sequence of these figures and that, particularly in the embodiment of FIG. 22, the flow pattern very closely approximates the ideal of a completely smooth inflow and a smooth outflow without disruptive vortices and turbulences.

In addition to the already stated advantage of a low energy consumption, the great advantage can also be noted that the quadcopter according to the invention makes in the order of magnitude of 20 dB SPL less noise than usual quadcopters.

An exactly adjustable pivoting of lifting rotors 60 is realized by means of stepping motors. Added to each lifting rotor 60 are stepping motors operating at mutual angles of 90°. Any direction can hereby be realized within the limits of the pivoting range 63. FIG. 11B shows two stepping motors 66. The spherical segments 67 indicate schematically that the lifting rotors can pivot in the manner of a sphere in a correspondingly shaped cup.

FIG. 11A shows access hatches 68. Opening hereof makes the stepping motors 66 accessible, for instance for maintenance or repair.

As shown particularly in FIG. 11B, the transition zones between compartments 64 and 65 and frame plate 59 also have smooth forms. This choice is also made with a view to the best possible aerodynamics.

Figure 12B:
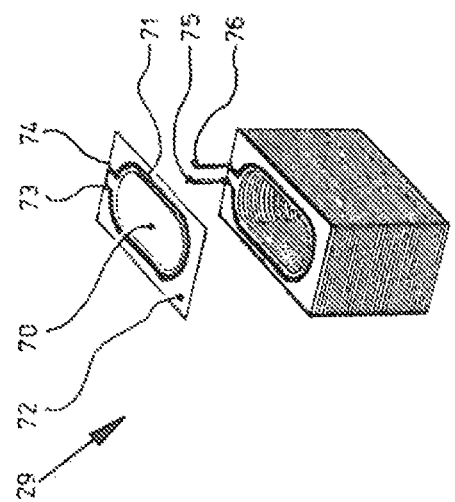
FIG. 12B shows a coil assembled from stacked electrically insulating carriers with electrically conductive tracks for co-action with the ferromagnetic core according to FIG. 12A.
Figure 12A:
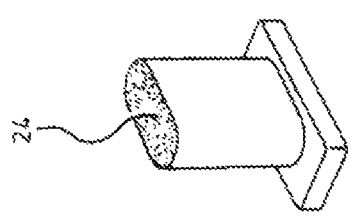
FIG. 12A shows a ferromagnetic core of an electromagnet.

FIG. 12A shows a core 69 as component of an electromagnet 26, 27. The core is for instance embodied as a granular and/or powder-form ferromagnetic material, for instance niobium, iron, ferrite or the like, embedded in polyetherimide.

FIG. 12B shows a coil 29 comprising a stack of thin printed circuit boards 72, for instance with a thickness in the order of a maximum of 0.1 mm, in which is present a through-hole 70 around which extends a loop-like copper track 71. Printed circuit boards 72 are stacked onto each other in the manner shown in FIG. 12B such that the free connections 73, 74 of copper track 71 can all come into contact with two electrical conductors 75, 76. Core 69 fits into the through-hole in the stack of printed circuit boards 72. An electromagnet 26, 27 is in this way realized.

Figure 13B:
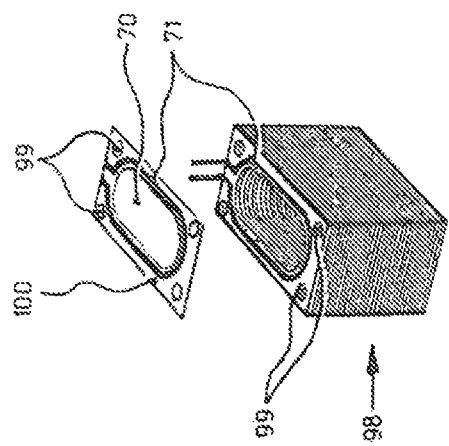
FIG. 13B shows a view corresponding to FIG. 12B of a coil assembled from stacked electrically insulating carriers with electrically conductive tracks which is likewise provided with continuous cooling channels.
Figure 13A:
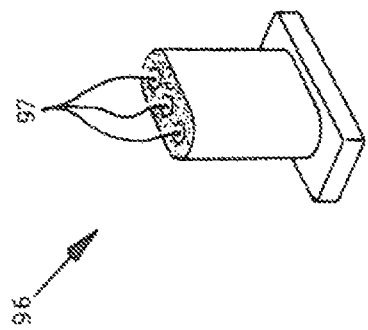
FIG. 13A shows a view corresponding to FIG. 12A of a ferromagnetic core of an electromagnet which comprises through-holes intended for passage of medium for cooling purposes.

FIG. 13A shows a ferromagnetic core 96 with the same general form as core 69 according to FIG. 12A. Core 96 differs from core 69 in the presence of continuous channels 97. Cooling medium can be guided through channels 97. The increase in temperature of core 96 can hereby remain limited to a chosen maximum value during operation.

FIG. 13B shows a coil 98 which, like coil 29 (FIG. 12B), comprises a stack of winding elements which each consist of an electrically insulating carrier and a loop-like conductor, for instance of copper, aluminium or other suitable material, present thereon. Situated in the four corner zones of each winding element 100 is a through-hole 99. These holes 99 are registered in coil 98, which comprises a stack of winding elements 100, and thus form four continuous cooling channels through which cooling medium can be guided for the purpose of cooling coil 98.

The conductive loop-like tracks 71 are situated around the registered through-holes 70 into which, as in the embodiment according to FIGS. 12A, 12B, the ferromagnetic core 96 fits.

Figure 14:
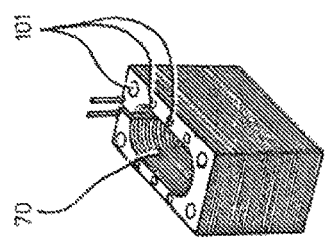
FIG. 14 shows a view corresponding to FIGS. 12B and 13B of a variant in which the conductive tracks extend over the whole relevant surfaces of the carriers and the number of cooling channels is increased compared to the embodiment according to FIG. 13B.

FIG. 14 shows a coil 102 which differs from coils 29 according to FIGS. 12B and 98 as according to FIG. 13B in the sense that the whole surface on one side of the electrically insulating carrier is provided with an electrically conductive layer, for instance of copper. Extending in this embodiment through both layers are ten cooling channels, all designated 101 here for the sake of convenience. The degree of cooling can hereby be substantially improved. It will be apparent that it is necessary to ensure in both the embodiment according to FIG. 13B and the embodiment according to FIG. 14 that the medium flowing through the cooling channels must only be in thermally conductive contact with the winding elements and that the cooling medium must be electrically separated therefrom. The cooling medium can optionally be guided via tubes through channels 97, which are formed by the registered holes 99, and the channels 101. It is for instance possible to envisage thermally conductive tubes, for instance of copper, provided on their outer side with an electrically insulating coating.

Figure 16:
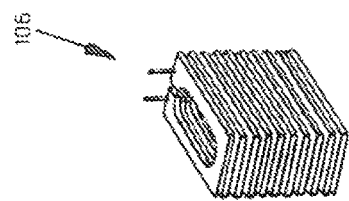
FIG. 16 shows a view corresponding to FIGS. 12B, 13B and 14 of an embodiment obtained with the structure according to FIG. 15.
Figure 15:
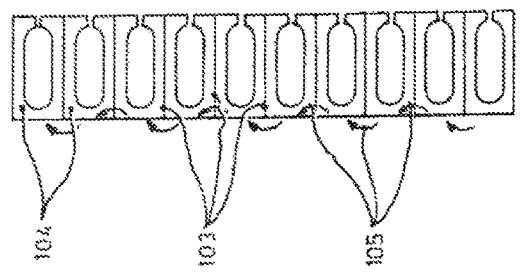
FIG. 15 shows a structure of carriers with conductors zigzag foldable in concertina manner and thus stackable for the purpose of manufacturing a stack of windings.

FIG. 15 shows schematically a strip of winding elements, all designated 104 and mutually connected via hinge zones 103. These elements can be laid on each other pivoting zigzag-wise in the manner indicated schematically with arrows 105. A stack 106 according to FIG. 16 can hereby be formed which corresponds functionally to the coil 29 according to FIG. 12B.

FIG. 17 shows an adhesive strip 107 in which permanent magnets 108 are embedded. Situated at the one end zone of adhesive strip 107 is an undercut recess 109, while at the other end zone is situated an undercut protrusion 110 which fits exactly into recess 109. By depositing the adhesive strip 109 in the correct manner on one of the truncated conical surfaces 14, 15 of ring 7 as according to FIG. 1 the magnets can be attached in the correct manner to these surfaces. This is a highly reliable and simple way of mounting the permanent magnets on rotor ring 7. Attention is drawn to the fact that FIG. 17 is schematic in the sense that the number of magnets 108 does not correspond to the number of magnetic poles 16, 17 according to FIG. 1. It should be therefore be understood that FIG. 17 serves only to elucidate the use of an adhesive strip provided with permanent magnets.

FIG. 18 shows two parts 77, 78 for assembling a rotor 79 according to FIG. 13.

Both rotor parts are manufactured by injection moulding of plastic. Each rotor part 77, 78 comprises eight blades. During assembly these equidistant sets of blades are placed such that a rotor is created with sixteen equidistantly placed blades.

Rotor parts 77, 78 can each be manufactured by injection moulding. The manufacture of a monolithic rotor by injection moulding is found to result in a very complicated and costly mould design. The proposed solution according to FIGS. 12 and 13 therefore has a very significant economic advantage.

Figure 19:
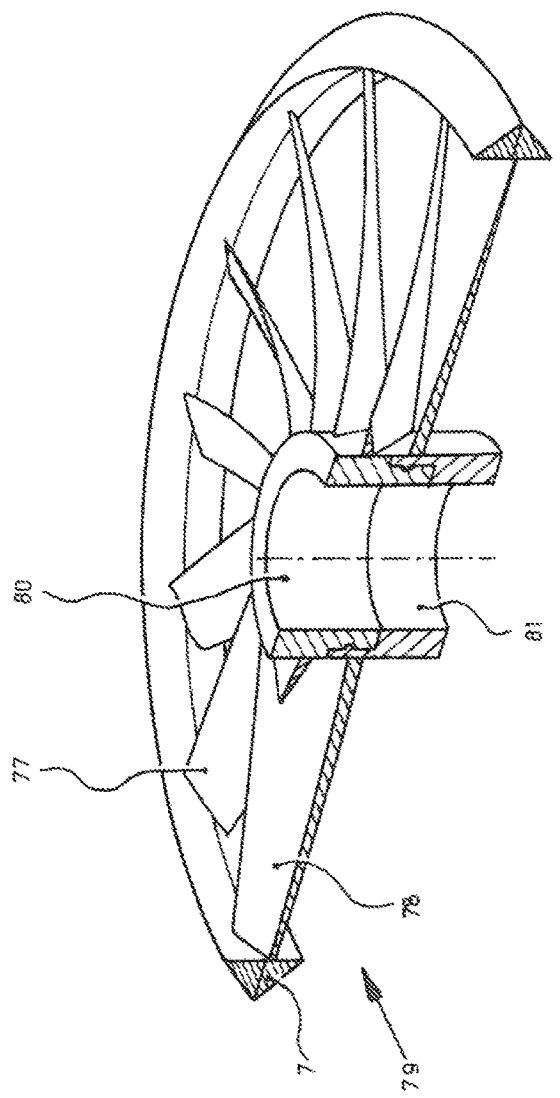
FIG. 19 shows a perspective partial view corresponding to FIG. 18 of a rotor assembled from the two rotor parts according to FIG. 18.

The hub parts 80, 81 can be slid together and subsequently locked to each other by means of a jam jar-like screw closure to form the rotor 79 as shown in FIG. 19. Hub parts 80 and 81 comprise for this purpose stop surfaces 82, 83 which can co-act with the respective mutually facing end surfaces 84, 85 of the other hub part. With rotation through a small angle a screw-tightening axial displacement takes place through co-action between the four partially helical protrusions 86 and the correspondingly shaped partially helical recesses 87. Rotor parts 77 and 78 are connected inseparably to each other along the associated adjacent surfaces of the ring, which are designated 88, 89, corresponding to the main plane of ring 7, and also along the described adjacent surfaces 82, 83, 84, 85 of hub parts 80, 81.

Figure 20:
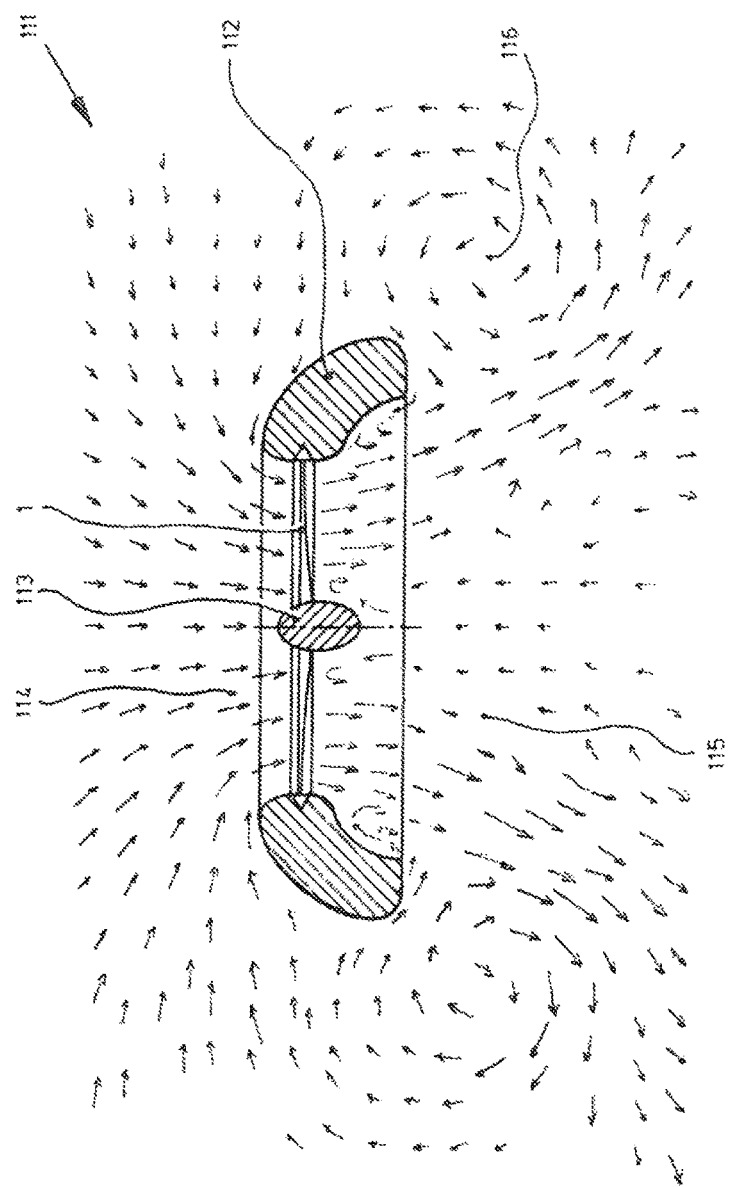
FIG. 20 shows a diametric section through a device according to the invention, in particular an air moving device, in which the directions of the local median flows are indicated with arrows.

FIG. 20 shows a separately drawn lifting rotor in the device 111. This comprises an annular frame 112. The structure of device 111 corresponds largely to the four lifting rotors 60 forming part of quadcopter 58 as according to FIGS. 11A and 11B. It is important to note that the more or less Y-shaped central hub 113 co-rotates with the rotor.

The local flow directions of the lifting rotor device 111 operating as air mover are drawn with the arrows. It is noted that this lifting rotor device could also be used as fan.

The flow pattern on the entry side 114 gives a smooth impression. This is due to the fact that, because of the nature of the invention and the superior aerodynamic qualities of the lifting rotor device 11, the rotor 1 can rotate substantially more slowly than functionally similar prior art rotors. It is otherwise noted here that the flow pattern according to FIG. 20 (and also the FIGS. 21, 22, 23 to be discussed below) is not completely two-dimensional but is essentially three-dimensional and dynamic. This is not however of primary relevance for the basic principles of the invention and the effects thereof.

The flow pattern on the exit side 115 gives a somewhat less smooth impression. It will be apparent that downward directed and upward directed flows are in the vicinity of each other. Partly as a result the occurrence of systematic vortices, for instance the more or less toroidal vortex system 116, cannot be prevented. It is not possible as a result to avoid the upward force caused directly by the rotor leaving something to be desired.

FIG. 21 shows a lifting rotor device 117 comprising an annular frame 118 having on its underside a convergent annular protrusion 119 which is formed by two mutually connecting concave surfaces 120, 121 which transpose smoothly on their sides remote from the protrusion into the largely toroidal convex other surface 122 of the annular frame 118.

Attention is drawn to the fact that the flow pattern on the downstream side, so the exit side of device 117, is considerably smoother than that in device 111 according to FIG. 20. This is because of the specific form of the annular frame 118 with protrusion 119. Compared to device 111, device 117 already gives a substantially improved aerodynamic result.

FIG. 22 shows a lifting rotor device 123 which differs in a number of important respects from device 117 according to FIG. 21.

The annular frame 124 has a form which clearly differs from that of annular frame 118 according to FIG. 21. Outer surface 125 has a somewhat more vertical position and the annular protrusion 126 protrudes little or not at all beyond the plane 127 defined by the lower part 128 of the convex surface 129 of the annular frame.

The more or less parabolic nose element 130 is further stationary relative to the rotating hub 131. The downstream part of hub 131 has a gently tapering, rotation-symmetrical form, the end surface of which has an encircling concave shape 132 such that peripheral zone 133 is sharp and in the centre is situated a tip 134, the apex of which lies roughly in the plane 135 of peripheral zone 133. Reference is also made in this respect to FIG. 23 which shows this on enlarged scale.

It is of great importance to note that both on the upstream side, or the entry side 114, and on the downstream side, or exit side 115, the flow pattern is exceptionally smooth. As shown clearly in FIG. 22, the medium flow is directed substantially wholly downward on the exit side 150. This greatly enhances the aerodynamic performance.

Attention is drawn to FIG. 23 which shows on enlarged scale a Von Karman vortex street system 136 present as wake in the more or less conical shape under the downstream end of hub 131. The vortices are to some extent elongate and are not in a strictly stationary state. The vortex speed is low and the disruption of the overall downstream flow is negligible. As a result the aerodynamic efficiency of device 123 is not disrupted, or hardly so, by any vortex system or turbulence. The device is therefore extremely low-noise and has an exceptionally high aerodynamic efficiency.

The height of the vortex cone according to FIG. 23 lies in the order of magnitude of three times the diameter of peripheral edge 133.

FIG. 24 shows a rotary transformer 155 comprising an annular stator 156 and an annular rotor 157, in this embodiment placed therein and co-acting electromagnetically therewith.

Stator 156 and rotor 157 both consist of electromagnetic elements, designated respectively 158 and 159.

Stator 156 and rotor 157 are each constructed from thirty-six of such elements. Another number can be chosen subject to the dimensioning of the device.

Each element comprises a respective ferromagnetic core 160, 161, in this embodiment with a general U-shape.

FIG. 25 shows the manner in which the cores 160 and 161 are relatively positioned.

Added to stator core 160 is a coil 162 which, when powered by an alternating current, provides for an alternating magnetic field between the poles, i.e. the end zones of the legs, of stator core 160. Owing to the momentary position of two cores 160, 161 shown in FIG. 25 an alternating magnetic field is generated in core 161 which generates an electromagnetic force (EMF) over rotor coil 163.

It should be understood that all electromagnetic elements of 158 of the stator each generate a magnetic field which varies in time, for instance varies in sinusoidal manner, but which are equal to each other. These fields together form a homogenous annular alternating magnetic field. An equal EMF is hereby generated over all rotor coils 163. By connecting the terminals of rotor coils 163, for instance in series, to each other these EMFs are added together and the cumulative voltage can be applied over heating elements forming part of blades 164 of rotor 165.

It will be apparent that the primary or stator coils 162 and the secondary or rotor coils 163 connected in series as described above can together behave as coils of one unitary stationary transformer.

A parallel connection or a combination of serial connections and parallel connections of the elements is also possible.

It is however important that the distances between the end zones of cores 160 and 161, or the so-called air gaps, are as small as possible and as constant as possible. This can be realized according to the invention by the embodiment according to FIG. 26 in which, as already described with reference to, among others, FIG. 3, the rotor is magnetically suspended during operation.

Figure 26:
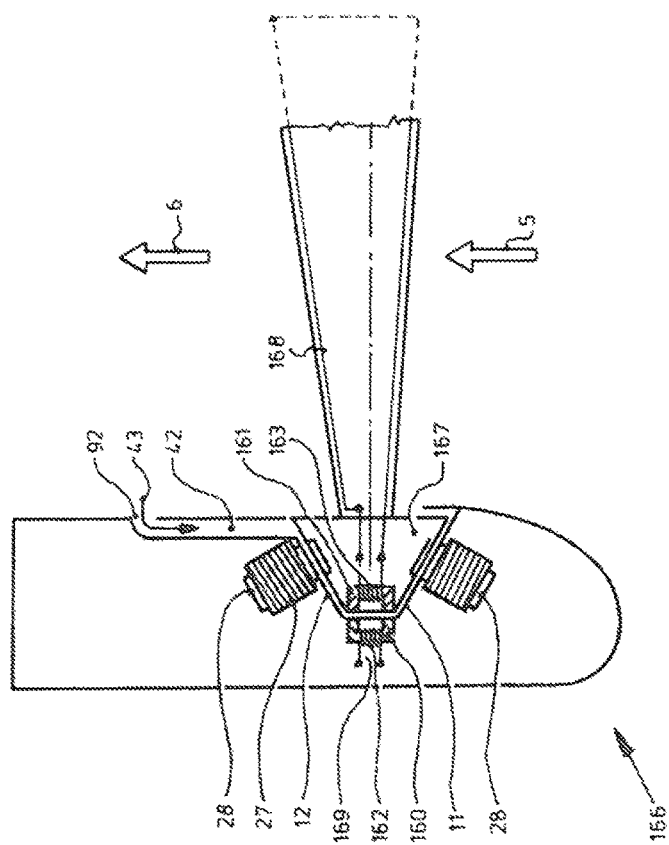
FIG. 26 shows a view corresponding to FIG. 3 of a detail of a device according to the invention with a rotary transformer for electrical heating of the blades.

FIG. 26 shows a more realistic view of a detail corresponding to FIG. 3 which differs from FIG. 3 only in the sense that in device 166 the rotor ring 167 does not have a sharp apex but a flattened apex which is modelled such that it carries the electromagnets 161, 163 in a more or less cylindrical configuration. These co-act with stator elements 160, 162 which are likewise disposed in a more or less cylindrical configuration.

FIGS. 24, 25 and 26 show that the primary coils 162 are powered via terminals 169 by for instance a mains voltage of 230 V, 50 Hz.

It should be understood that, due to the assembly of the annular stator 156 from thirty-six electromagnetic elements 158, in the case of serial connection or parallel connection the magnetic field generated by the stator can be annular and stationary. This field is transmitted to the thirty-six electromagnetic rotor elements 159 which, likewise through serial connection or parallel connection, can generate an alternating voltage which is stationary, i.e. constant over time, in the manner of a stationary transformer. Reference is made once again in this latter respect to FIG. 26.

FIG. 26 shows schematically that in this embodiment of the invention the rotor coils 163, for instance connected to each other in series, supply power to cover layers 168 of resistance material, for instance of constantan or inconel, present on rotor blades 4, i.e. provide for conduction of alternating current therethrough. Cover layers 168, which serve as heating elements, are hereby heated to for instance the temperature in the order of magnitude of 70-80° C. The inflowing unheated airflow 5 is hereby heated and a heated airflow 6 is emitted. Cover layers 168 are embedded or lie recessed relative to the aerodynamic basic profile of each blade 4 such that this profile is not disrupted or obstructed thereby in any way whatsoever, nor does it display transition zones or transition edges which could cause vortices or turbulences.

Indicated as application for a heating element as shown in and described with reference to FIGS. 24, 25 and 26 are a space heater for household use, i.e. a fan heater, a hairdryer or other air heating device which must heat air at a temperature in the order of 20° C. to a temperature in the order of magnitude of 60 to 70° C.

It is noted that ring 167 has a cross-section with the form of an isosceles trapezium. A stable magnetic suspension can be realized owing to the symmetrical structure of the truncated conical sides 11, 12.

The invention claimed is:

1. A rotary device for converting one form of energy to another form of energy, which forms of energy are electrical energy and the energy of a flowing medium, the device comprising:

a frame with an inlet and an outlet and a rotation-symmetrical guide for the flowing medium extending between the inlet and the outlet;

a rotor supported rotatably at least during operation by said frame and having a central hub and a number of blades which are connected to said hub in angularly equidistant arrangement and which extend at least in a radial direction, which blades all have a form such that a relation between the flowing medium and the rotation of the rotor is obtained;

the rotor comprising a concentric ring to which ends of the blades are connected;

the ring having a first truncated conical surface and a second truncated conical surface equal to the first truncated conical surface, the first truncated conical surface and the second truncated conical surface having mutually opposite orientations and having a radial section with a general shape of an isosceles triangle or trapezium, the base of the isosceles triangle or trapezium extends parallel to the central axis and the sides of the isosceles triangle or trapezium converge radially outward;

the medium guide having an encircling recess, the form of which corresponds to that of the ring such that the ring fits with clearance into the encircling recess; and energy converting means, one part of which is connected fixedly to the frame and another part is connected fixedly to the rotor, the energy converting means comprising:

magnets on each of the truncated conical surfaces corresponding to said sides, which magnets are placed angularly equidistant spaced apart at a first pitch and the poles of each magnet debouching on said truncated conical surfaces, wherein a width of the space between the magnets is less than a width of the magnets; and electromagnets having poles, the poles of the electromagnets being placed equidistantly which poles of the electromagnets debouch on both corresponding surfaces of the encircling recess facing the ring;
wherein the ring with the magnets and the frame with the electromagnets together form an annular electrical motor or an electric generator, and wherein first poles of the magnets at the first truncated conical surface are placed such that the first poles are offset half the first pitch relative to second poles of the magnets at the second truncated conical surface.

2. The device as claimed in claim 1, wherein the rotor ring is assembled from:
two identical part-rings which each comprise a strip of material with the shape of a part of a circular arc, free ends of each strip of material are connected to each other such that each strip has the form of the outer surface of a truncated cone, which thus modelled strips are connected with their outer circular peripheral edge to each other; and
a third part-ring, the third part-ring comprising a strip of material which is curved to a round form and mutually connects respective free circular inner edges and outer edges of the first two part-rings; and
the ends of the blades are connected to the third part-ring.

3. The device as claimed in claim 1, wherein each electromagnet comprises a coil comprising:
a stack of electrically insulating carriers each with at least one electrically conductive track present thereon which forms at least one winding of the coil, which tracks debouch on an outer side of the respective carriers and are connected to each other electrically such that the windings formed by the tracks together form the coil, which carriers have through-holes through which a ferromagnetic core extends.

4. The device as claimed in claim 1, further comprising:
an inflow grill which is placed upstream of the inlet and which comprises a pattern of baffles placed and formed such that channels bounded by these baffles have directions corresponding to the directions of local part-flows of the medium.

5. The device as claimed in claim 1, further comprising a stationary, substantially rotation-symmetrical nose element which is disposed fixedly relative to the frame or forms part of the rotor and which is disposed upstream relative to the hub and has an outer surface which widens from an upstream side to a downstream side and which connects at its rear side to the hub.

6. The device as claimed in claim 5, wherein a longitudinal section of an outer surface of the nose element has a form of a parabola, the extreme of which is situated at the upstream end of the nose element.

7. The device as claimed in claim 5, wherein the nose element is disposed fixedly relative to the frame and is supported by the frame via spokes.

8. The device as claimed in claim 1, wherein the frame is provided with a collar of channels which via a collar of openings guide medium part-flows from the area of the downstream medium flow into the clearance between the ring and the walls of the recess such that these part-flows flow along the poles of the electromagnets and the magnets and thus cool these electromagnets and the magnets and leave the clearance in the area of the upstream medium flow.

9. The device as claimed in claim 1, wherein the device further comprises auxiliary bearing means, and wherein the rotor is supported by the frame via the auxiliary bearing means.

10. The device as claimed in claim 1, wherein the frame has on the outlet side a convergent annular protrusion which is formed by two mutually connecting concave surfaces which on their sides remote from the protrusion transpose smoothly into a largely toroidal, convex other surface of the frame.

11. The device as claimed in claim 10, wherein the downstream part of the hub has a tapering rotation-symmetrical form, the end surface of which has an encircling concave form such that an end of a downstream part of the hub is sharp and in a center is situated a tip, the apex of which lies at least roughly in the plane of the end of the downstream part of the hub.

12. A system for operating a device according to claim 1, comprising an electronic unit which is configured to:
supply the electromagnets with alternating currents such that through the electromagnetic interaction between the electromagnets and the magnets the rotor is driven rotatingly; or
convert the currents induced in the electromagnets by throughflowing medium during rotating drive of the rotor to a form of electric current; or
wherein the electronic unit is further configured to supply the electromagnets with alternating currents such that the rotor is suspended magnetically during operation.

13. A rotary device for converting one form of energy to another form of energy, which forms of energy are electrical energy and the energy of a flowing medium, the device comprising:
a frame with an inlet and an outlet and a rotation-symmetrical guide for the flowing medium extending between the inlet and the outlet;
a rotor supported rotatably at least during operation by said frame and having a central hub and a number of blades which are connected to said hub in angularly equidistant arrangement and which extend at least in a radial direction, which blades all have a form such that a relation between the flowing medium and the rotation of the rotor is obtained;
the rotor comprising a concentric ring to which ends of the blades are connected;
the ring having a first truncated conical surface and a second truncated conical surface equal to the first truncated conical surface, the first truncated conical surface and the second truncated conical surface having mutually opposite orientations and having a radial section with a general shape of an isosceles triangle or trapezium, the base of the isosceles triangle or trapezium extends parallel to the central axis and the sides of the isosceles triangle or trapezium converge radially outward;
the medium guide having an encircling recess, the form of which corresponds to that of the ring such that the ring fits with clearance into the encircling recess; and
energy converting means, one part of which is connected fixedly to the frame and another part is connected fixedly to the rotor, the energy converting means comprising:
magnets on each of the truncated conical surfaces corresponding to said sides, which magnets are placed angularly equidistant spaced apart at a first pitch and the poles of each magnet debouching on said truncated conical surfaces; and
electromagnets having poles, the poles of the electromagnets being placed equidistantly which poles of the electromagnets debouch on both corresponding surfaces of the encircling recess facing the ring;
wherein the ring with the magnets and the frame with the electromagnets together form an annular electrical motor or an electric generator, and wherein first poles of each of the magnets at the first truncated conical surface are placed such that the first poles are offset half the first pitch relative to second poles of each of the magnets at the second truncated conical surface.

14. The device as claimed in claim 13, wherein the rotor ring is assembled from:
   two identical part-rings which each comprise a strip of material with the shape of a part of a circular arc, free ends of each strip of material are connected to each other such that each strip has the form of the outer surface of a truncated cone, which thus modelled strips are connected with their outer circular peripheral edge to each other; and
   a third part-ring, the third part-ring comprising a strip of material which is curved to a round form and mutually connects respective free circular inner edges and outer edges of the first two part-rings; and
   the ends of the blades are connected to the third part-ring.

15. The device as claimed in claim 13, wherein each electromagnet comprises a coil comprising:
   a stack of electrically insulating carriers each with at least one electrically conductive track present thereon which forms at least one winding of the coil, which tracks debouch on an outer side of the respective carriers and are connected to each other electrically such that the windings formed by the tracks together form the coil, which carriers have through-holes through which a ferromagnetic core extends.

16. The device as claimed in claim 13, further comprising:
   an inflow grill which is placed upstream of the inlet and which comprises a pattern of baffles placed and formed such that channels bounded by these baffles have directions corresponding to the directions of local part-flows of the medium.

17. The device as claimed in claim 13, further comprising a stationary, substantially rotation-symmetrical nose element which is disposed fixedly relative to the frame or forms part of the rotor and which is disposed upstream relative to the hub and has an outer surface which widens from an upstream side to a downstream side and which connects at its rear side to the hub.

18. The device as claimed in claim 13, wherein the frame is provided with a collar of channels which via a collar of openings guide medium part-flows from the area of the downstream medium flow into the clearance between the ring and the walls of the recess such that these part-flows flow along the poles of the electromagnets and the magnets and thus cool these electromagnets and the magnets and leave the clearance in the area of the upstream medium flow.

19. The device as claimed in claim 13, wherein the device further comprises auxiliary bearing means, and wherein the rotor is supported by the frame via the auxiliary bearing means.

20. A system for operating a device according to claim 13, comprising an electronic unit which is configured to:
   supply the electromagnets with alternating currents such that through the electromagnetic interaction between the electromagnets and the magnets the rotor is driven rotatingly; or
   convert the currents induced in the electromagnets by throughflowing medium during rotating drive of the rotor to a form of electric current; or
   wherein the electronic unit is further configured to supply the electromagnets with alternating currents such that the rotor is suspended magnetically during operation.

* * * * *